US012162710B2

(12) United States Patent
Obata et al.

(10) Patent No.: US 12,162,710 B2
(45) Date of Patent: Dec. 10, 2024

(54) PRINTING APPARATUS

(71) Applicant: CANON KABUSHIKI KAISHA, Tokyo (JP)

(72) Inventors: Tsutomu Obata, Tokyo (JP); Yoshiaki Suzuki, Chiba (JP); Kenji Shimamura, Saitama (JP); Ryoya Shinjo, Kanagawa (JP); Ryosuke Araki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/211,861

(22) Filed: Jun. 20, 2023

(65) Prior Publication Data

US 2023/0331504 A1 Oct. 19, 2023

Related U.S. Application Data

(63) Continuation of application No. 17/488,477, filed on Sep. 29, 2021, now Pat. No. 11,760,598.

(30) Foreign Application Priority Data

Sep. 30, 2020 (JP) ................................ 2020-166106

(51) Int. Cl.
*B65H 31/30* (2006.01)
*B41J 11/70* (2006.01)
(Continued)

(52) U.S. Cl.
CPC .............. *B65H 31/30* (2013.01); *B41J 11/70* (2013.01); *B65H 29/12* (2013.01); *B65H 35/04* (2013.01);
(Continued)

(58) Field of Classification Search
CPC ...................................................... G03G 21/16
(Continued)

(56) References Cited

U.S. PATENT DOCUMENTS 3,476,210 A 11/1969 Carlson
4,662,765 A 5/1987 Kapp et al.
(Continued)

FOREIGN PATENT DOCUMENTS

EP 0 180 370 A2 5/1986
JP 2002-179320 A 6/2002
(Continued)

OTHER PUBLICATIONS

U.S. Appl. No. 17/484,353, Yoshiaki Suzuki Tsutomu Obata Kenji Shimamura Ryoya Shinjo Ryosuke Araki, filed Sep. 24, 2021.
(Continued)

*Primary Examiner* — Leslie A Nicholson, III
(74) *Attorney, Agent, or Firm* — Venable LLP

(57) ABSTRACT

A printing apparatus includes a stacking portion on which a print medium printed by a printing unit configured to perform printing is stacked, a discharge unit configured to discharge the print medium printed by the printing unit to the stacking portion, a passage forming portion arranged facing the stacking portion and configured to form a discharge passage of the print medium together with the stacking portion, and an outlet port located at a downstream end of the stacking portion and a downstream end of the passage forming portion in a conveying direction of the print medium. The passage forming portion includes an opening/closing portion which is displaceable between a closed position for forming the discharge passage and an open position for opening access to the stacking portion.

18 Claims, 16 Drawing Sheets

(51) Int. Cl.
*B65H 29/12* (2006.01)
*B65H 35/04* (2006.01)
*G03G 21/16* (2006.01)

(52) U.S. Cl.
CPC ....... *G03G 21/16* (2013.01); *B65H 2404/722* (2013.01); *B65H 2405/40* (2013.01)

(58) Field of Classification Search
USPC .......................................................... 399/124
See application file for complete search history.

(56) References Cited

U.S. PATENT DOCUMENTS

| | | | |
|---|---|---|---|
| 5,337,134 | A | 8/1994 | Sato et al. |
| 6,142,469 | A | 11/2000 | Nanba et al. |
| 6,260,837 | B1 | 7/2001 | Nanba et al. |
| 6,457,705 | B2 | 10/2002 | Nanba et al. |
| 6,600,885 | B2 | 7/2003 | Kida |
| 6,722,650 | B1 | 4/2004 | Abbata et al. |
| 6,824,128 | B2 | 11/2004 | Nagata et al. |
| 7,284,752 | B2 | 10/2007 | Nagata et al. |
| 7,328,894 | B2 | 2/2008 | Terao et al. |
| 7,364,149 | B2 | 4/2008 | Terao et al. |
| 7,379,689 | B2 | 5/2008 | Kotani |
| 7,455,284 | B2 | 11/2008 | Kotani |
| 8,256,759 | B2 | 9/2012 | Dobashi |
| 8,606,169 | B2 | 12/2013 | Kitayama |
| 8,616,671 | B2 | 12/2013 | Lawther et al. |
| 9,403,654 | B2 | 8/2016 | Kawamoto et al. |
| 11,451,681 | B2 | 9/2022 | Shimazu et al. |
| 2010/0224717 | A1 | 9/2010 | Iwasaki |
| 2013/0300054 | A1 | 11/2013 | Ishii |
| 2021/0276348 | A1 | 9/2021 | Suto et al. |

FOREIGN PATENT DOCUMENTS

| | | | |
|---|---|---|---|
| JP | 2009-037188 | A | 2/2009 |
| JP | 2014-048530 | A | 3/2014 |
| JP | 2015-105158 | A | 6/2015 |
| JP | 2020-044728 | A | 3/2020 |

OTHER PUBLICATIONS

U.S. Appl. No. 17/488,510, Yoshiaki Suzuki Tsutomu Obata Kenji Shimamura Ryoya Shinjo Ryosuke Araki, filed Sep. 29, 2021.

Office Action dated Jul. 26, 2024, in Japanese Patent Application No. 2020-166106.

PRINTING APPARATUS

BACKGROUND OF THE INVENTION

Field of the Invention

The present invention relates to a printing apparatus.

Description of the Related Art

There has been proposed a printing apparatus including, inside the apparatus, a stacking portion used to stack a printed print medium (for example, Japanese Patent Laid-Open No. 2014-48530). A user takes out the print medium from an outlet port communicating with the stacking portion.

However, depending on the installation mode of the printing apparatus, it may be difficult for the user to take out the print medium from the outlet port. Particularly, when taking out a long print medium, the user is required to take out the print medium so as to pull it out from the stacking portion while grasping the leading end of the print medium. If the work space around the outlet port is small, it is more difficult to take out the print medium.

SUMMARY OF THE INVENTION

The present invention provides a technique that makes it easier to take out a printed print medium from a stacking portion.

According to an aspect of the present invention, there is provided a printing apparatus comprising: a stacking portion on which a print medium printed by a printing unit configured to perform printing is stacked; a discharge unit configured to discharge the print medium printed by the printing unit to the stacking portion; a passage forming portion arranged facing the stacking portion and configured to form a discharge passage of the print medium together with the stacking portion; and an outlet port located in a downstream end of the stacking portion and a downstream end of the passage forming portion in a conveying direction of the print medium, wherein the passage forming portion includes an opening/closing portion which is displaceable between a closed position for forming the discharge passage and an open position for opening the stacking portion.

Further features of the present invention will become apparent from the following description of exemplary embodiments (with reference to the attached drawings).

DESCRIPTION OF THE EMBODIMENTS

Figure 1:
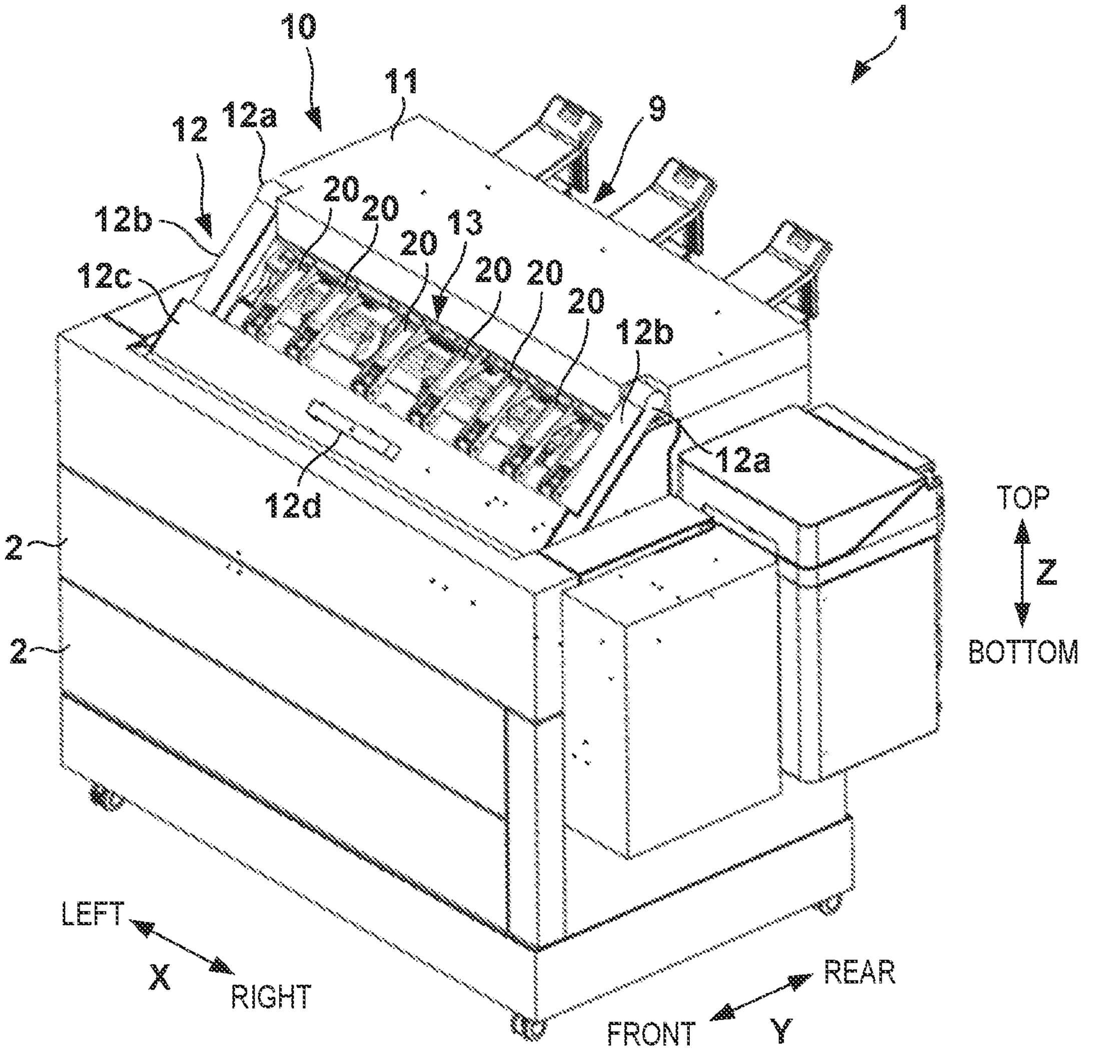
FIG. 1 is an external perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

Figure 2:
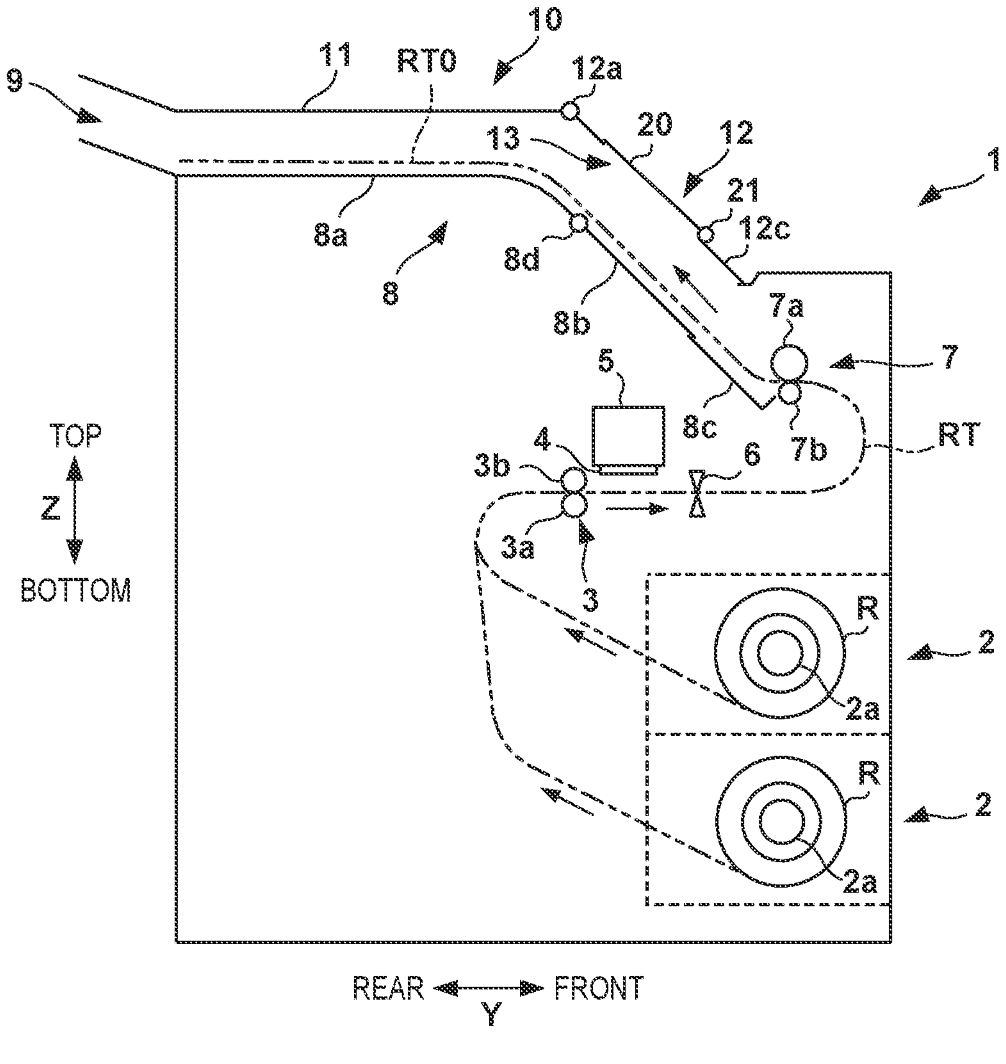
FIG. 2 is a schematic view showing the internal structure of the printing apparatus shown in FIG. 1.

FIG. 1 is an external perspective view of a printing apparatus 1 according to an embodiment of the present invention, and FIG. 2 is a schematic view showing the internal structure of the printing apparatus 1. An arrow X indicates the widthwise direction (left-and-right direction) of the printing apparatus 1, an arrow Y indicates the depth direction (front-and-rear direction) of the printing apparatus 1, and an arrow Z indicates the vertical direction. Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, plastic film, and the like may be used as print media.

In the lower portion of the printing apparatus 1, a plurality of feeding units 2 are vertically arranged in a plurality of stages (two stages in this example). Each feeding unit 2 forms a storage portion that stores a roll sheet R as a print medium. Each feeding unit 2 includes a support portion 2*a* that supports the roll sheet R so as to be rotatable around the X-direction axis, and also includes a feeding mechanism (not shown) that pulls out a sheet from the roll sheet R and feeds it to a conveyance passage RT. The conveyance passage RT is a sheet passage defined by a guide structure (not shown), and extends from the feeding unit 2 to an outlet port 9 while curving in the midway. In the following description, an upstream side and a downstream side are the upstream side and the downstream side with respect to the sheet conveying direction, respectively.

In this embodiment, the outlet port 9 is located in the rear portion of the printing apparatus 1. The feeding unit 2 can be pulled out forward from the printing apparatus 1, so that the user can perform an exchange operation of the roll sheet R from the front of the printing apparatus 1. Note that in this embodiment, the roll sheet R is exemplified as the print medium, but the print medium may be a cut sheet.

The sheet pulled out from the roll sheet R is supplied via a conveying unit 3 to a position facing a printhead 4. The conveying unit 3 includes a conveying roller 3*a*, which is a driving roller, and a nip roller 3*b*, which is a driven roller pressed against the conveying roller 3*a*. While being nipped by the conveying roller 3*a* and the nip roller 3*b*, the sheet is conveyed on the conveyance passage RT in the arrow direction by rotation of the rollers.

The printhead 4 is arranged on the downstream side of the conveying unit 3. The printhead 4 in this embodiment is an inkjet printhead which prints an image on a sheet by discharging ink. The printhead 4 uses a discharge energy generating device such as an electrothermal transducer (heater) or a piezoelectric device to discharge ink from the discharge port. The printing apparatus 1 according to this embodiment is a serial scanning inkjet printing apparatus, and the printhead 4 is mounted on a carriage 5. The carriage 5 is configured to be reciprocated in the X direction (the widthwise direction of the sheet) by a driving mechanism (not shown). In the vicinity of the printhead 4, the sheet is conveyed in the Y direction. By alternately repeating intermittent conveyance of the sheet by the conveying unit 3 and an operation including moving the carriage 5 and ink discharge by the printhead 4, an image is printed on the sheet.

Note that the serial scanning printing apparatus is exemplarily shown in this embodiment, but the present invention is also applicable to a full-line printing apparatus. In this case, along printhead extending in the widthwise direction of a sheet is used as the printhead 4. Then, by discharging ink from the printhead while continuously conveying the sheet, an image is printed on the sheet. Further, although the inkjet printing apparatus is exemplarily shown in this embodiment, the present invention is also applicable to printing apparatuses of other printing types.

A cutting unit 6 is arranged on the downstream side of the printhead 4. The cutting unit 6 cuts the sheet, which has been pulled out from the roll sheet R and has an image printed thereon, in the widthwise direction of the sheet. Further, a discharge unit 7 is arranged on the downstream side of the cutting unit 6. The discharge unit 7 includes a discharge roller 7*a*, which is a driving roller, and a nip roller 7*b* pressed against the discharge roller 7*a*. A stacking portion 8 is arranged on the downstream side of the discharge unit 7, and the discharge unit 7 conveys, to the stacking portion 8, the sheet with the image printed thereon by the printhead 4. The sheet is cut into a cut sheet by the cutting unit 6 in the process of conveyance to the stacking portion 8 by the discharge unit 7, passes through the discharge unit 7, and is stacked on the stacking portion 8. The stacking portion 8 forms a tray which receives a plurality of sheets discharged from the discharge unit 7.

A passage forming portion 10 is arranged so as to face the stacking portion 8 in the Z direction and forms, together with the stacking portion 8, a discharge passage RT0 (a part of the conveyance passage RT) extending from the discharge unit 7 to the outlet port 9. In the rear portion of the printing apparatus 1, the outlet port 9 is formed by a gap between the downstream end of the passage forming portion 10 and the downstream end of the stacking portion 8. The passage forming portion 10 also forms the top portion of the printing apparatus 1. The passage forming portion 10 is formed so as to guide the sheet to the downstream side of the discharge passage RT0 while suppressing floating of a sheet discharged from the discharge unit 7 and occurrence of a jam thereof. The passage forming portion 10 and the stacking portion 8 form the discharge passage RT0 which is almost horizontal in the rear portion in the Y direction and slopes upward toward the rear portion in the front portion in the Y direction.

The gap between the stacking portion 8 and the passage forming portion 10 is related to the number of sheets stackable on the stacking portion 8. For example, in a specification in which a hundred sheets each having a thickness of 0.1 mm are stacked, the gap between the stacking portion 8 and the passage forming portion 10 is formed to be equal to or larger than 10 mm. Particularly, the sheet pulled out from the roll sheet R and cut tends to curl in the leading end. The gap between the stacking portion 8 and the passage forming portion 10 is designed in consideration of such curling.

<Take-out of Printed Print Medium>

Figure 3:
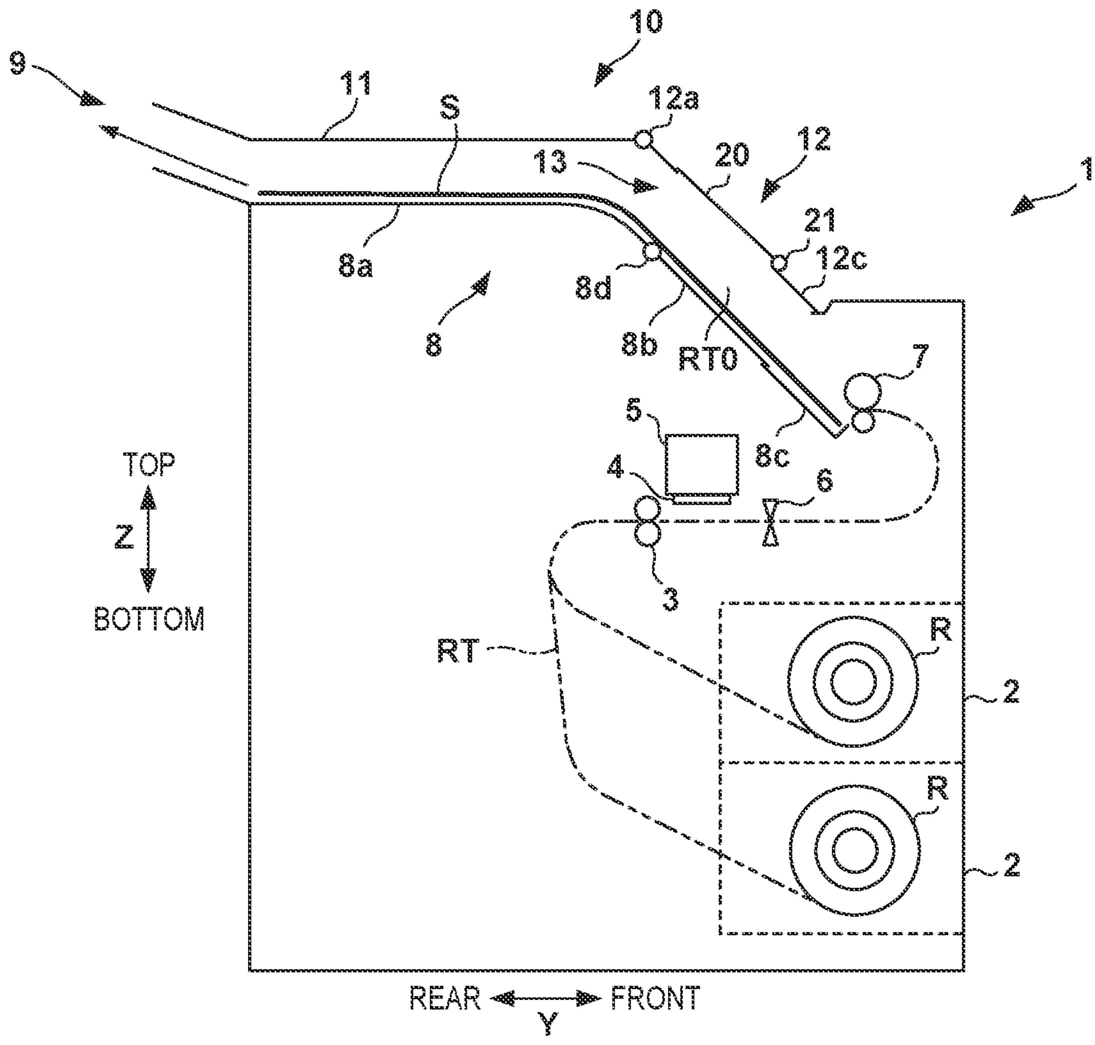
FIG. 3 is a view for explaining an operation of the printing apparatus shown in FIG. 1.

FIG. 3 shows a mode in which a printed sheet S is stacked on the stacking portion 8. Since the stacking portion 8 is arranged inside the printing apparatus 1, when taking out the sheet S, the user can take out the sheet S by pulling out the sheet S from the outlet port 9 in the arrow direction. In this embodiment, since the outlet port 9 is formed in the rear portion of the printing apparatus 1, when using the outlet port 9, the user goes around to the rear portion of the printing apparatus 1 and takes out the sheet S. Depending on the environment of a room where the printing apparatus 1 is installed, the work space for the user cannot be sufficiently ensured behind the printing apparatus 1. Under such an environment, it is difficult for the user to take out the sheet S from the outlet port 9. In this embodiment, the arrangement described below makes it possible to take out the sheet from the stacking portion 8 also from the front face side of the printing apparatus 1. This makes it easy for the user to take out the sheet S from the stacking portion 8, and the convenience of the printing apparatus 1 can be improved.

The passage forming portion 10 includes a fixed portion 11 on the rear side in the Y direction, and an opening/closing portion 12 on the front side in the Y direction. The fixed portion 11 is an immovable part which cannot be opened and closed. The opening/closing portion 12 is a movable part that is connected to the fixed portion 11 via a hinge portion 12*a*. The hinge portion 12*a* forms a pivot axis in the X direction, and the opening/closing portion 12 can pivot around the pivot axis of the hinge portion 12*a*. The opening/closing portion 12 includes a pair of arm portions 12*b* extending from the hinge portion 12*a* and a connection portion 12*c* connecting the end portions of the pair of arm portions 12*b*. A handle 12*d* is provided on the connection portion 12*c*, and the user can perform an opening/closing operation of the opening/closing portion 12 by grasping the handle 12*d*.

Figure 4:
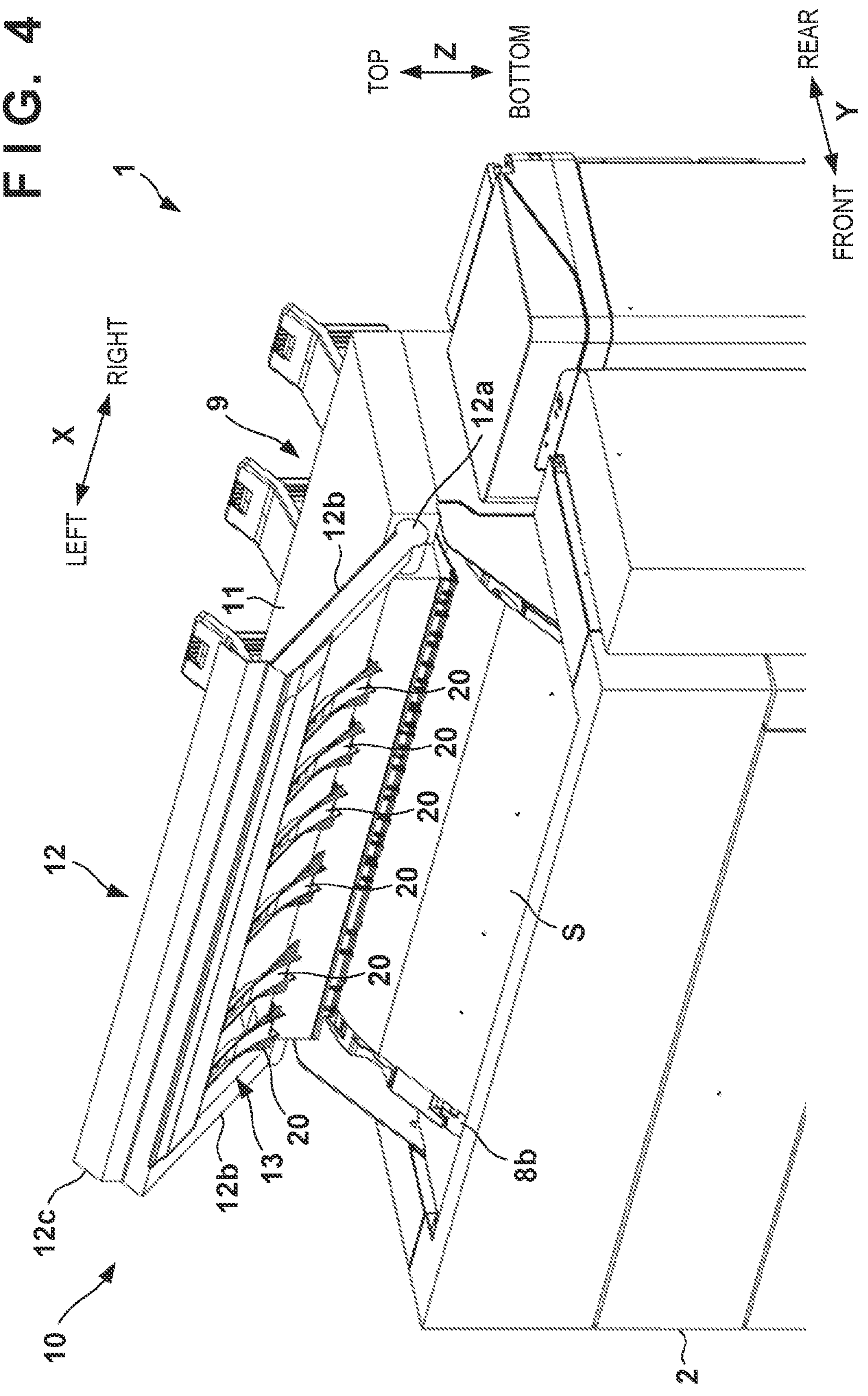
FIG. 4 is a view for explaining another operation of the printing apparatus shown in FIG. 1.
Figure 5:
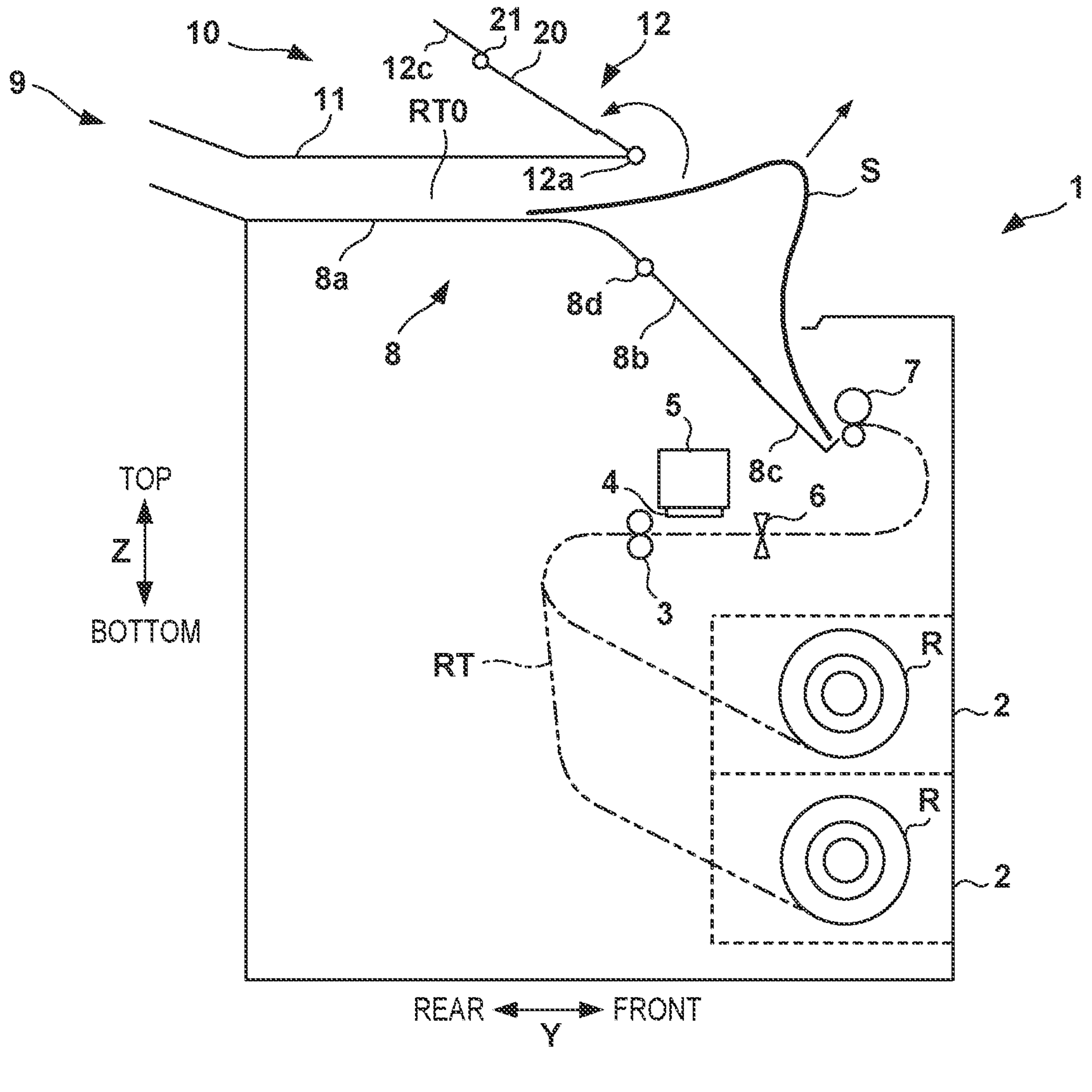
FIG. 5 is a view for explaining still another operation of the printing apparatus shown in FIG. 1.

The opening/closing portion 12 can be displaced, by pivot motion, between a closed position where the opening/closing portion 12 forms the discharge passage RT0 and the open position where the opening/closing portion 12 opens the stacking portion 8. Each of FIGS. 1 to 3 shows a mode in which the opening/closing portion 12 is located in the closed position. Each of FIGS. 4 and 5 shows a mode in which the opening/closing portion 12 is located in the open position. FIG. 4 is a view for explaining an operation of the printing apparatus 1, and a perspective view of the printing apparatus 1. FIG. 5 is a schematic view showing the internal structure of the printing apparatus 1, and shows a mode of taking out the sheet S by the user.

As shown in FIGS. 4 and 5, in the mode in which the opening/closing portion 12 is located in the open position, the stacking portion 8 and the discharge passage RT0 are open to the upside of the printing apparatus 1. The opening/closing portion 12 is located closer to the front portion side of the printing apparatus 1 than the outlet port 9. If the opening/closing portion 12 is displaced to the open position, the sheet S stacked on the stacking portion 8 is exposed to the outside in the upper portion and front portion of the printing apparatus 1 as shown in FIG. 4. Therefore, as shown in FIG. 5, the user can take out the sheet S from the front face side of the printing apparatus 1.

Next, a take-out port 13 is formed in the opening/closing portion 12 according to this embodiment. Also, in the mode in which the opening/closing portion 12 is located in the closed position, the user can take out the printed sheet S from the stacking portion 8 via the take-out port 13. The take-out port 13 is also located closer to the front portion side of the printing apparatus 1 than the outlet port 9, so that the user can take out the sheet S from the front face side of the printing apparatus 1.

Referring to FIGS. 1 to 4, the take-out port 13 according to this embodiment is a rectangular opening defined by the front edge of the fixed portion 11, the pair of arm portions 12*b*, and the connection portion 12*c*. In the opening/closing portion 12, guide members 20 arranged so as to overlap the take-out port 13 are provided. The sheet S passes between the stacking portion 8 and the guide members 20. A plurality of guide members 20 are arrayed in the X direction in this embodiment, but there may be only one guide member 20.

Figure 6A:
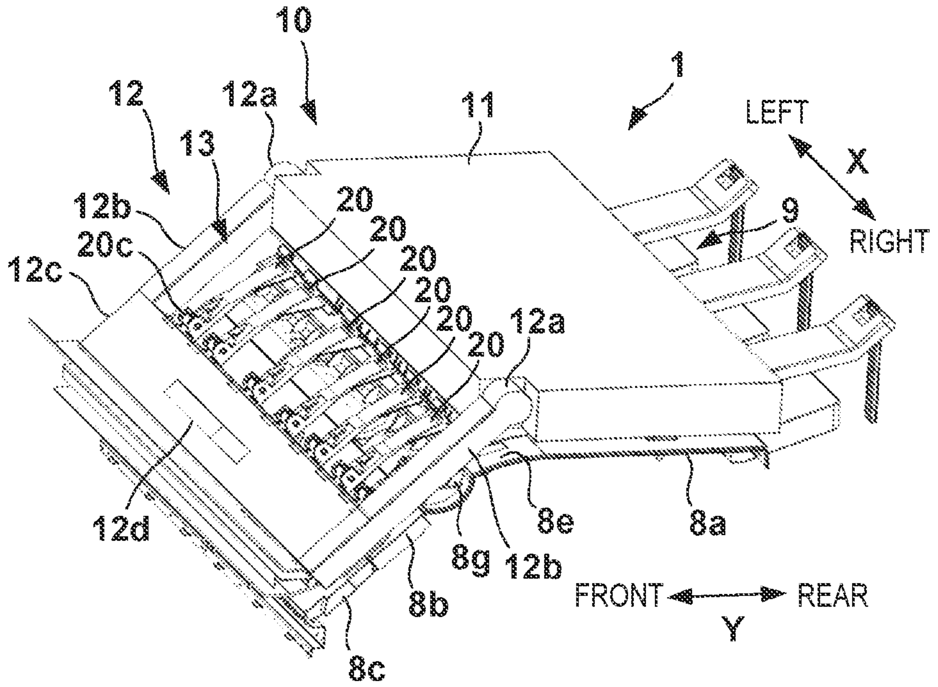
FIGS. 6A and 6B are views for explaining still another operation of the printing apparatus shown in FIG. 1.
Figure 6B:
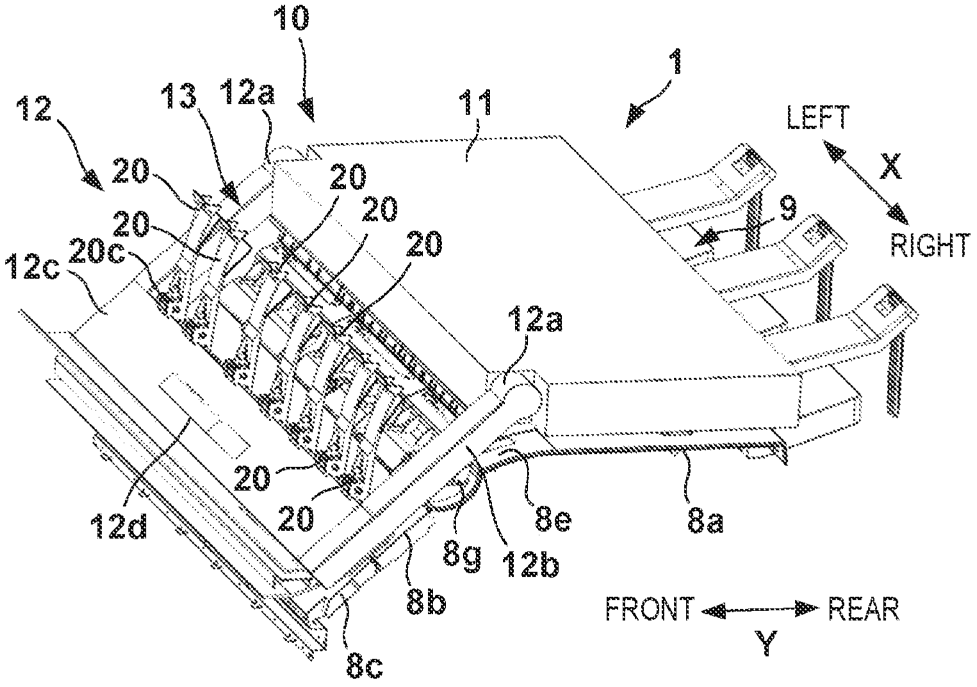
Figure 7A:
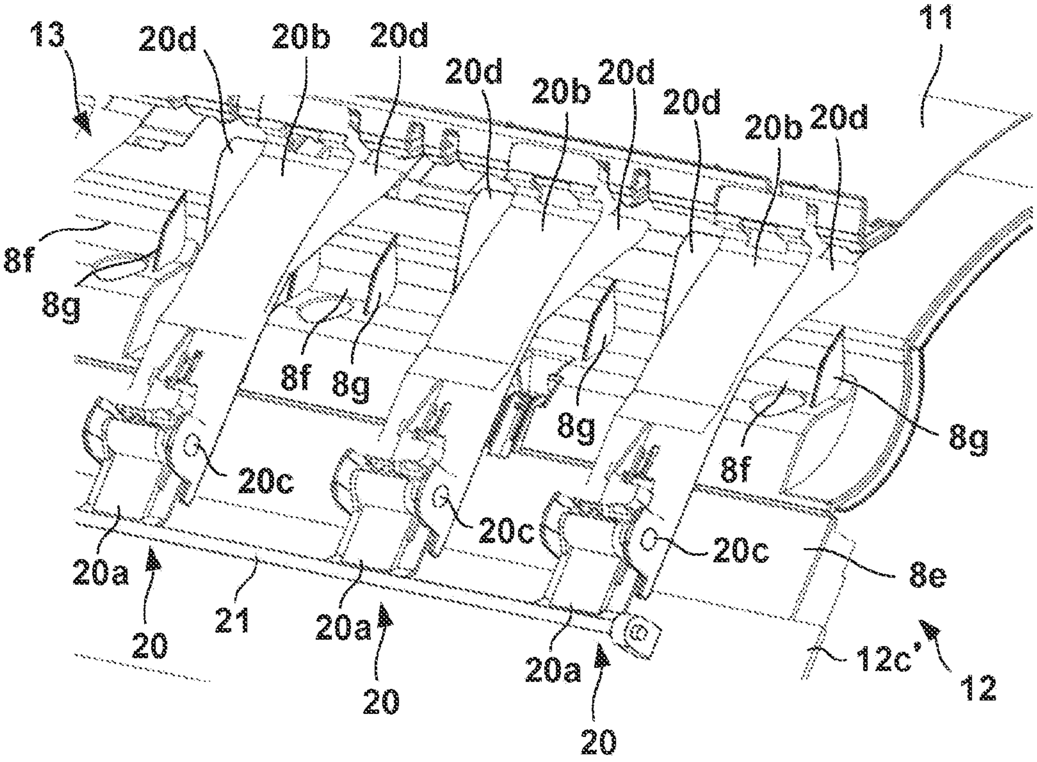
FIGS. 7A and 7B are views for explaining guide members.
Figure 7B:
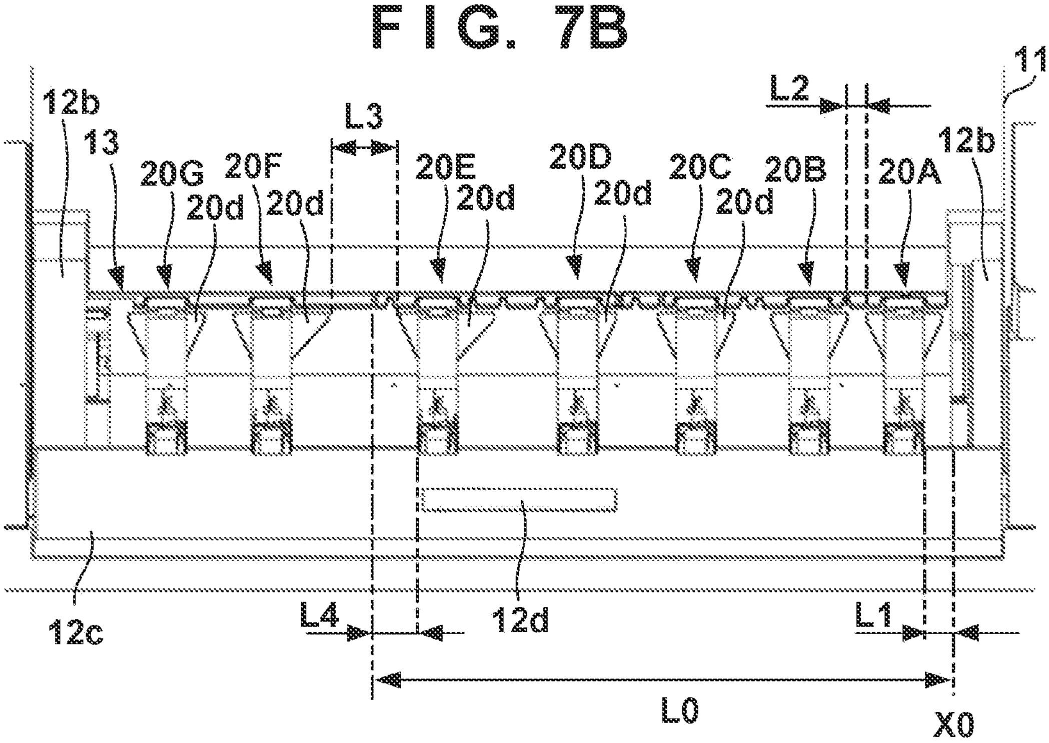
Figure 8A:
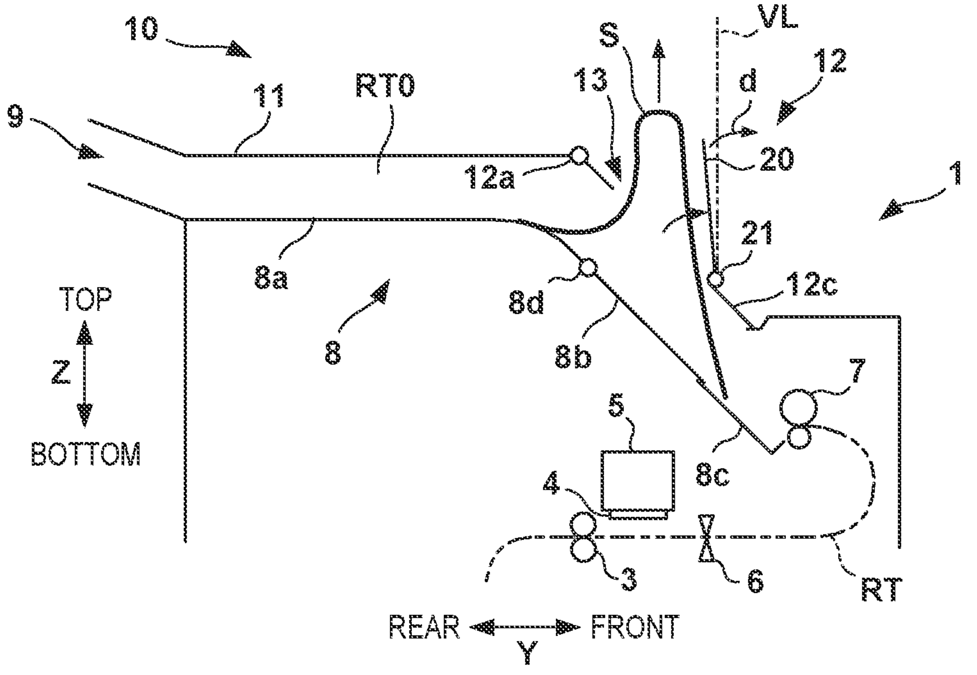
FIGS. 8A and 8B are views for explaining still another operation of the printing apparatus shown in FIG. 1.
Figure 8B:
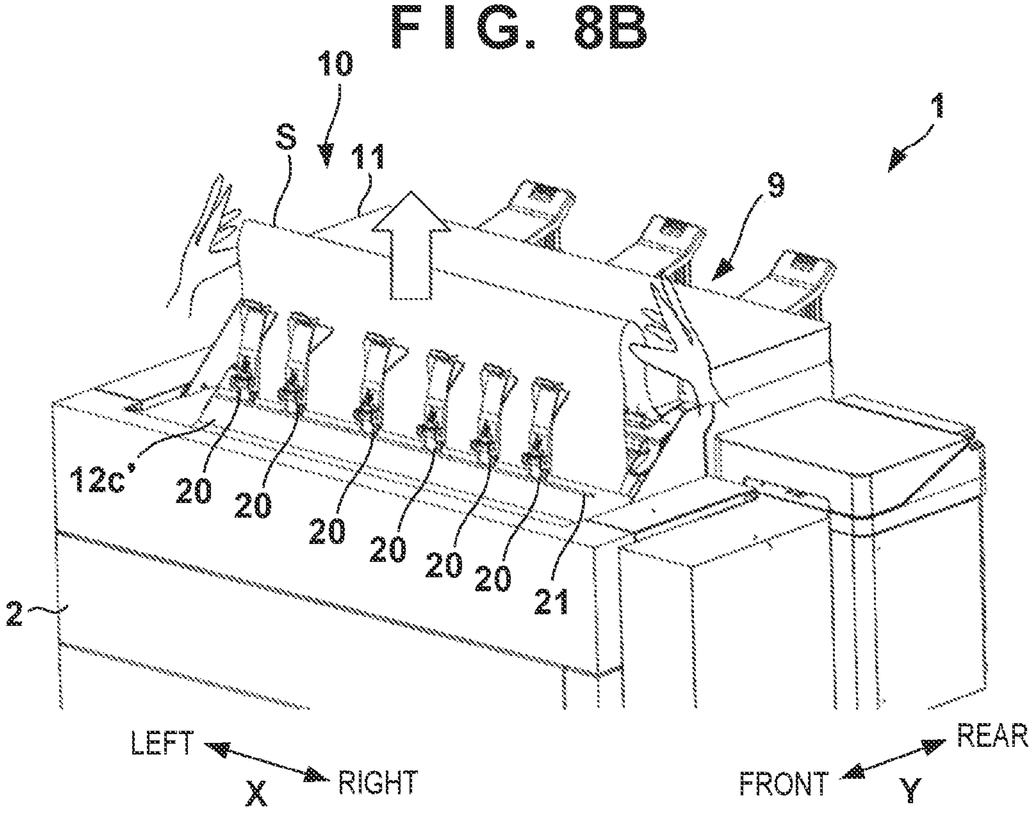

The arrangement of the guide members 20 will be further described with reference to FIGS. 6A to 8B in addition to FIGS. 1 to 5. FIGS. 6A and 6B are views for explaining an operation of the printing apparatus 1, and show the displacement mode of the guide members 20. FIGS. 7A and 7B are views for explaining the guide members 20. FIG. 7A is a perspective view around the guide members 20, and FIG. 7B is a view showing an arrangement mode of the plurality of guide members 20. FIGS. 8A and 8B are views for explaining an operation of the printing apparatus, and show a mode of taking out the sheet S.

Each guide member 20 overlaps the take-out port 13, and can be displaced between a closed position for guiding the conveyance of the sheet S and an open position for opening the take-out port 13. In this embodiment, each guide member 20 can be displaced between the open position and the closed position by pivot motion. FIG. 6A shows a mode in which the guide member 20 is located in the closed position. The guide member 20 is normally located in the closed position, where it suppresses entry of the sheet S into the take-out port 13 during a printing operation and guides the sheet S along the discharge passage RT0. FIG. 6B shows a mode in which the guide member 20 is located in the open position. In the open position, the guide member 20 is in a mode in which it is retracted from the take-out port 13, and the stacking portion 8 and the discharge passage RT0 are exposed via the take-out port 13. When the user takes out the sheet S from the take-out port 13, the user displaces the guide member 20 from the closed position to the open position. Thus, the user can take out the sheet S from the take-out port 13.

The guide member 20 is an elongated strip-shaped member as a whole extending in almost the Y direction, and includes a base portion 20*a* on the front side in the Y direction and a guide portion 20*b* extending from the base portion 20*a* to the rear side in the Y direction. The base portion 20*a* includes the upstream-side end portion of the guide member 20, and the guide portion 20*b* includes the downstream-side end portion of the guide member 20. The base portion 20*a* is pivotably supported by a base portion 12*c*' of the connection portion 12*c*. The connection portion 12*c* is formed in a two-layer structure including the base portion 12*c*' on the lower side and a cover on the upper side. The base portion 20*a* is pivotably supported by a shaft 21 extending in the X direction in a space between the base portion 12*c*' and the cover.

In this embodiment, the shaft 21 is a shaft common to all the guide members 20, and the respective base portions 20*a* of all the guide members 20 are fixed to the shaft 21. The shaft 21 is pivotably supported by the base portion 12*c*'. Accordingly, when any one of the guide members 20 is caused to pivot, the shaft 21 pivots and all the guide members 20 are interlockingly caused to pivot. For example, if one guide member 20 is displaced from the closed position to the open position, all of the remaining guide members 20 are interlockingly displaced from the closed position to the open position. To the contrary, if one guide member 20 is displaced from the open position to the closed position, all of the remaining guide members 20 are interlockingly displaced from the open position to the closed position. Therefore, the user operability of the guide members 20 can be improved. Note that the respective guide members 20 may be individually caused to pivot, or not all but some of the guide members 20 may be interlockingly caused to pivot.

In this embodiment, the pivot range of the guide member 20 on the closed position side is restricted by the distal end of the guide portion 20*b* abutting against the fixed portion 11 so as to lean against it. In order to restrict a pivot motion of the guide member 20 to the open position side caused by overloading of a large number of sheets S on the stacking portion 8, a lock mechanism for holding the guide member 20 in the closed position may be provided. Alternatively, a sensor that detects a pivot motion of the guide member 20 to the open position side caused by overloading of a large number of sheets S on the stacking portion 8 may be provided to issue an alert if overloading is detected.

In this embodiment, the pivot range of the guide member 20 on the open position side is restricted by the base portion 20*a* abutting against the connection portion 12*c*. In this embodiment, as shown in FIG. 8A, the open position of the guide member 20 is a position closer to the closed position side than a vertical line VL passing through the shaft 21 (a position where the barycenter of the guide member 20 is closer to the closed position side than the vertical line VL, for example, a position of 85° from the horizontal direction). With this, the guide member 20 returns to the closed position due to its own weight, so the user need not perform an operation of returning the guide member 20 to the closed position. This improves the convenience of the printing apparatus 1. Further, by restricting the pivot motion of the guide member 20 to the position close to the vertical line VL, the direction of taking out the sheet S by the user is restricted to the upward direction from the take-out port 13.

This take-out direction is advantageous because the discharge unit 7 or the like does not hinder take-out of the sheet S.

In the structure in which the pivot range of the guide member 20 on the open position side is restricted by the abutment between the base portion 20*a* and the connection portion 12*c* as in this embodiment, if the guide member 20 is further pressed to the open direction from the open position, an excessive load may act on the base portion 20*a* and the connection portion 12*c*. Therefore, in this embodiment, the guide member 20 is configured to be bendable in the open direction. More specifically, the base portion 20*a* and the guide portion 20*b* are connected to each other via a shaft 20*c*, and the guide portion 20*b* is formed to be pivotable with respect to the base portion 20*a* to the open direction (the direction of an arrow d in FIG. 8A) in the pivot direction of the guide member 20. The guide portion 20*b* is constantly biased to the side of the closed direction (the direction opposite to the arrow d in FIG. 8A) with respect to the base portion 20*a* by an elastic member (not shown) such as a torsion coil spring. Thus, normally, the guide member 20 is maintained in a linear posture. If an excessive load in the open direction (the direction of the arrow d) acts on the guide member 20, the guide portion 20*b* is caused to pivot in the open direction with the shaft 20*c* as the center of pivot, and the guide member 20 is changed to a bent posture. With this, the load is relieved, and damage to the guide member 20 or the connection portion 12*c* can be avoided.

Note that as the structure of bending the guide member 20, other than the structure using the shaft 20*c*, an elastic member can be used for the entire guide member 20 or partially in the midway in the longitudinal direction of the guide member 20.

The arrangement of the plurality of the guide members 20 in the X direction will be described with reference to FIG. 7B. The plurality of the guide members 20 are arranged spaced apart from each other in the X direction. For the descriptive convenience, the respective guide members 20 are referred to as guide members 20A, 20B, . . . , 20G in the order from the guide member 20 in the right end in FIG. 7B. In this embodiment, regardless of a difference in size of the sheet S, the sheet S is conveyed such that one end (right side) of the sheet S in the widthwise direction is located at a reference position X0 in the X direction. The positions of the guide members 20A to 20G are set in accordance with a plurality of size types of the sheets S.

The guide member 20A is arranged at a position spaced apart from the reference position X0 by a distance L1 (for example, about 30 mm), and corresponds to the guidance of the sheets S of all sizes. The guide members 20B to 20G are arranged so as to correspond to the frequently used sizes (for example, A4, A3, A2, A1, A0, and the like), and each of the guide members 20B to 20G is arranged at a position inward of the sheet spaced apart from the left side of the sheet of the corresponding size by a predetermined distance (for example, 30 mm). For example, the guide member 20E is arranged at a position inward of the sheet (on the side of the reference position X0) spaced apart, by a distance L4 (for example, 30 mm), from the position which is away from the reference position X0 by a width L0 of a sheet of A1 size.

By arranging the respective guide members 20 as described above, for any size, it is possible to press both the left and right ends of the sheet S where floating and curling are most likely to occur during the conveyance of the sheet S. This enables stable sheet conveyance. In addition, since the respective guide members 20 are arranged inward of the sheet spaced apart from the left and right sides of the sheets S of respective sizes, when the user takes out the sheet S via the take-out port 13, the user can easily grasp the left and right ends of the sheet S and readily take out the sheet S.

In the stacking portion 8, a recess portion 8*f* recessed from a stacking surface 8*e* for the sheet S is formed in a part facing the take-out port 13. The recess portion 8*f* extends in the X direction. A plurality of ribs 8*g* defining the stacking surface 8*e* in the formation region of the recess portion 8*f* are provided in the recess portion 8*f*. The plurality of ribs 8*g* are arranged spaced apart from each other in the X direction. By providing the plurality of ribs 8*g*, the sheet S does not enter the recess portion 8*f*. By providing the recess portion 8*f*, when the user takes out the sheet S via the take-out port 13, the user can easily grasp the left and right ends of the sheet S by inserting his/her fingers into the recess portion 8*f*, thereby readily taking out the sheet S.

Extending portions 20*d* of the guide member 20 will be described with reference to FIGS. 7A and 7B. In the guide member 20 according to this embodiment, the extending portion 20*d* is provided on each of the left and right sides of the end portion of the guide portion 20*b*. The extending portion 20*d* is a portion formed by increasing the X-direction width of the guide portion 20*b*. The extending portion 20*d* has a triangular blade shape that is narrow on the upstream side and wide on the downstream side in appearance. By providing the extending portions 20*d*, it is possible to improve the guidance performance for the sheet S and suppress occurrence of a jam between the adjacent guide members 20. In other words, if the X-direction width of the guide member 20 is uniformly increased, the guidance performance during conveyance of the sheet S is improved, but it becomes difficult for the user to grasp the sheet S when the user takes out the sheet S via the take-out port 13. As in this embodiment, by forming the guide member 20 to be narrow as a whole but partially wide by providing the extending portions 20*d*, it is possible to achieve both the guidance performance for the sheet S and easy take-out of the sheet S.

From the viewpoint of suppressing occurrence of a jam of the sheet S, each of distances L2 and L3 between adjacent extending portions 20*d* is advantageously equal to or smaller than a predetermined distance (for example, equal to or smaller than 80 mm). On the other hand, in this embodiment, the respective guide members 20 are arranged so as to correspond to the sizes of the sheets S as described above, so they are not arranged at equal pitches in the X direction. Therefore, by making the shapes of the extending portions 20*d* of some guide members 20 different from the shapes of the extending portions 20*d* of the other guide members 20, the distances between the adjacent extending portions 20*d* are adjusted. In the example shown in FIG. 7B, the shape of the right extending portion 20*d* of each of the guide members 20E and 20F is different from the shapes of the other extending portions 20*d*, and has a triangular shape which is longer in the X direction than the other extending portions. With this, the separation distance between the left extending portion 20*d* of the guide member 20E and the right extending portion 20*d* of the guide member 20F is adjusted to be decreased. Further, the separation distance between the left extending portion 20*d* of the guide member 20D and the right extending portion 20*d* of the guide member 20E is adjusted to be decreased. With the adjustment as described above, it is possible to suppress occurrence of a jam of the sheet S even if the interval between the adjacent guide members 20 changes.

FIGS. 8A and 8B show a mode in which the user takes out the sheet S from the stacking portion 8 via the take-out port 13. FIG. 8B shows the base portion 12*c*' of the connection portion 12*c*.

The user can take out the sheet S by holding both end portions of the sheet S in the widthwise direction and pulling out the sheet S upward. When taking out the sheet S, the respective guide members 20 are pushed by the sheet S and collectively displaced from the closed position to the open position. Accordingly, the guide members 20 do not hinder take-out of the sheet S, and the user need not hold the guide members 20 and displace them to the closed position. At this time, since the guide members 20 act to press the sheet S downward at a plurality of positions in the widthwise direction of the sheet S, generation of winkles and folds can be suppressed during the take-out of the sheet S. After the sheet S is taken out from the take-out port 13, the guide member 20 automatically returns to the closed position from the open position due to its own weight as described above, so the user need not hold the guide member 20 and displace it to the closed position.

As has been described above, in this embodiment, as the method of taking out the printed sheet S from the stacking portion 8, it is possible to select a method between two methods including the method of displacing the opening/closing portion 12 to the open position and taking out the sheet S and the method of taking out the sheet S from the take-out port 13 while keeping the opening/closing portion 12 in the closed position, in addition to the method of taking out the sheet S from the outlet port 9. In either of the two methods, the sheet S can be taken out from the front face side of the printing apparatus 1, so the user need not go around the side of the outlet port 9 (the rear side of the printing apparatus 1). In the method of displacing the opening/closing portion 12 to the open position and taking out the sheet S, the stacking portion 8 and the discharge passage RT0 are largely exposed, so that a large number of the sheets S stacked therein can be simultaneously taken out. In the method of taking out the sheet S from the take-out port 13 while keeping the opening/closing portion 12 in the closed position, the user can directly access and take out the sheet S on the stacking portion 8 from the take-out port 13. Accordingly, the opening/closing operation is unnecessary. This enables the user to quickly take out a small number of sheets S.

<Internal Maintenance>

Figure 9:
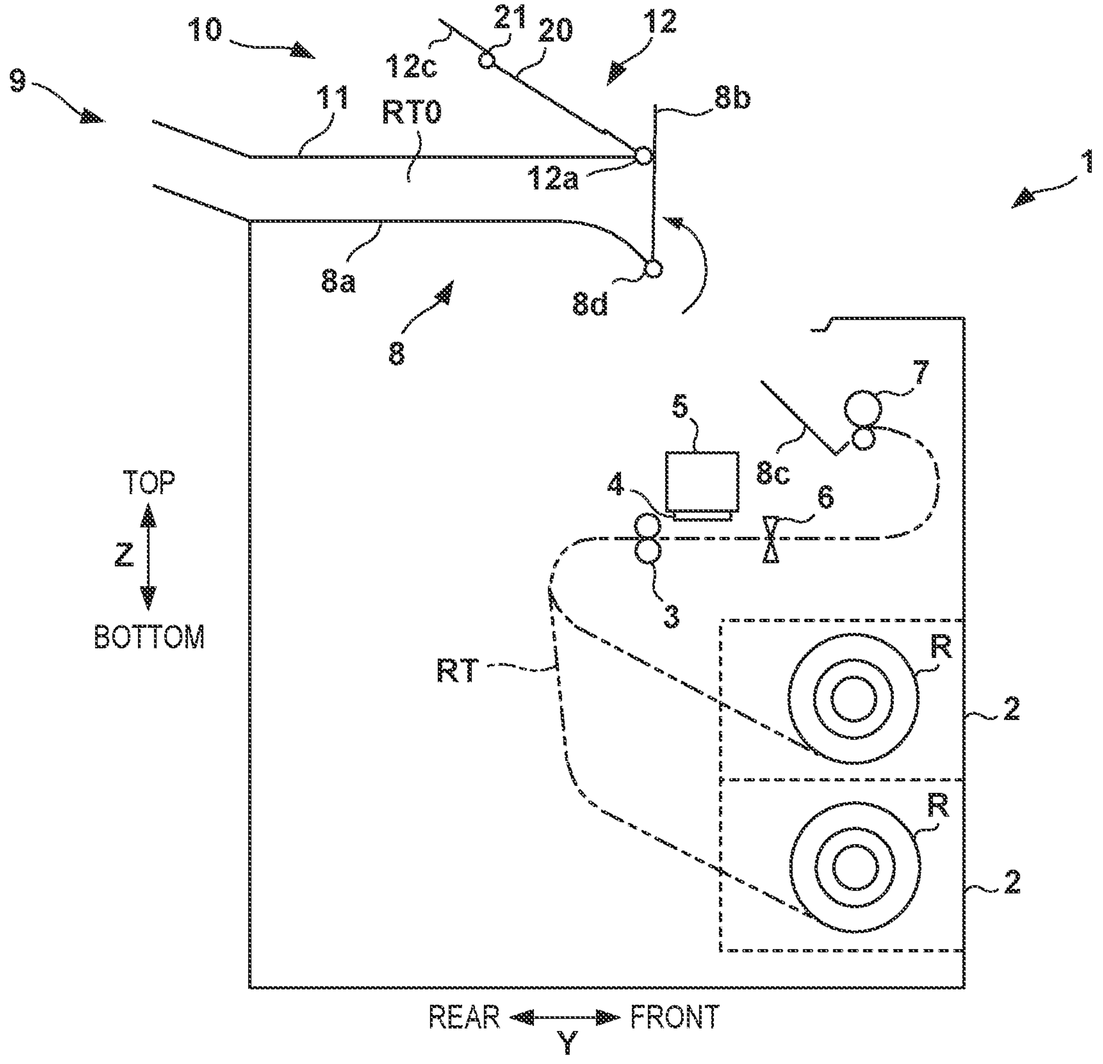
FIG. 9 is a view for explaining still another operation of the printing apparatus shown in FIG. 1.

There are the conveying unit 3, the printhead 4, the carriage 5, the cutting unit 6, and the like below the stacking portion 8. It is also required to perform maintenance of these components and cancel a jam of the sheet S in the conveyance passage RT. In the printing apparatus 1 according to this embodiment, a part of the stacking portion 8 is movable to expose the arrangement below the stacking portion 8. With reference to FIGS. 2 and 9, the opening/closing structure of the stacking portion 8 will be described. FIG. 9 is a view for explaining an operation of the printing apparatus 1, and shows the movable mode of the stacking portion 8.

The stacking portion 8 includes a fixed portion 8*c*, a movable portion 8*b*, and a fixed portion 8*a* from the upstream side to the downstream side. When viewed in the Y direction, the fixed portion 8*c*, the movable portion 8*b*, and the fixed portion 8*a* are arranged in this order from the front side to the rear side. The fixed portions 8*a* and 8*c* are immovable parts which cannot be opened and closed.

The movable portion 8*b* is arranged at a position facing the opening/closing portion 12 in the Z direction. The movable portion 8*b* is pivotably connected to the fixed portion 8*a* via a hinge portion 8*d*, which forms a pivot axis in the X direction, and an openable/closable part that can be displaced between a closed position shown in FIG. 2 and an open position shown in FIG. 9. The pivot motion of the movable portion 8*b* to the closed position side is restricted by the upstream end of the movable portion 8*b* abutting (overlapping) against the downstream end of the fixed portion 8*c*. In the closed position, the movable portion 8*b* forms the stacking surface 8*e* for the sheet S together with the fixed portions 8*a* and 8*c*. When the movable portion 8*b* is displaced to the open position, the inside of the printing apparatus 1 covered by the stacking portion 8 is exposed upward. By setting the opening/closing portion 12 in the open position and displacing the movable portion 8*b* to the open position, the user can perform maintenance of the inside of the apparatus, cancellation a jam of the sheet S, and the like.

Second Embodiment

In the first embodiment, the structure has been exemplarily shown which enables selection, as the method of taking out the printed sheet S from the stacking portion 8, between the two methods including the method of taking out the sheet S from the take-out port 13 by displacing the opening/closing portion 12 to the open position and the method of taking out the sheet S from the outlet port 9 while keeping the opening/closing portion 12 in the closed position. However, a structure that supports either one of the two methods may be provided. For example, a structure that includes the opening/closing portion 12 may not include the take-out port 13 and the guide members 20. Alternatively, the opening/closing portion 12 may be formed to be a fixed portion, and the take-out port 13 and the guide members 20 may be provided in the fixed portion. In either of the arrangement examples, it is possible to take out the printed sheet S from a part different from the outlet port 9, and the printed sheet S can be easily taken out from the stacking portion 8.

Third Embodiment

Figure 10A:
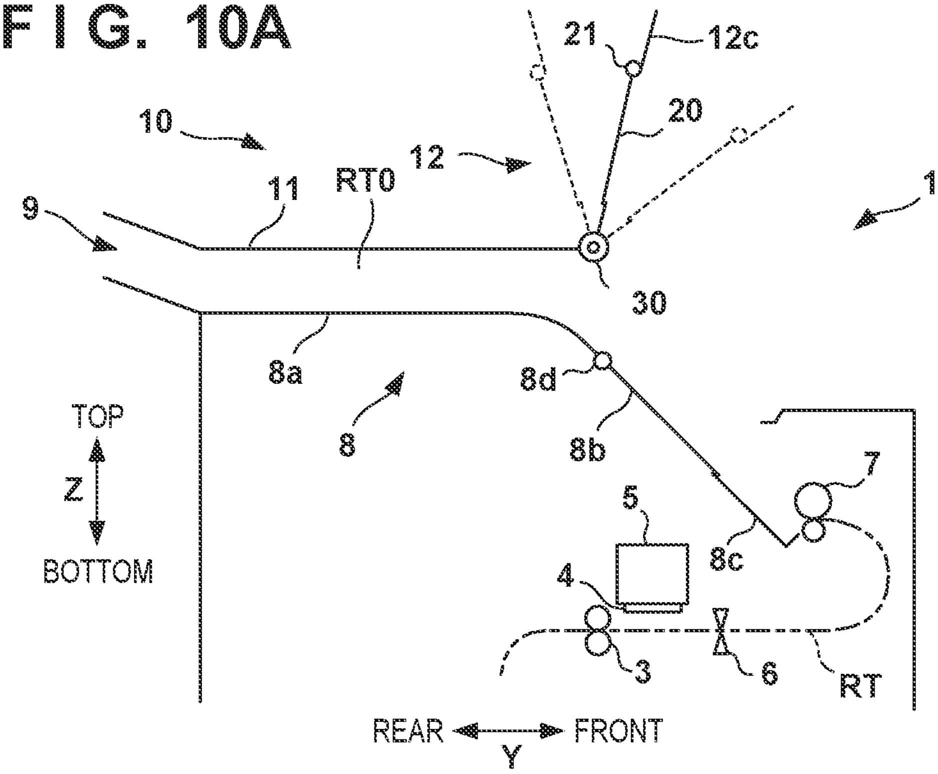
FIG. 10A is a view for explaining the third embodiment.

In the first embodiment, the opening/closing portion 12 rests in two positions including the closed position and the open position, but the opening/closing portion 12 may be configured to be stoppable in an arbitrary position between the closed position and the open position. FIG. 10A is a schematic view showing an example of this configuration. A torque hinge 30 is provided as a hinge portion 12*a* at the center of pivot of an opening/closing portion 12. By using the torque hinge 30, it is possible to hold the opening/closing portion 12 in an arbitrary pivot position as exemplarily shown by each dashed line. This can prevent the opening/closing portion 12 from being displaced unintentionally while the user is taking out a sheet S.

Fourth Embodiment

Figure 10B:
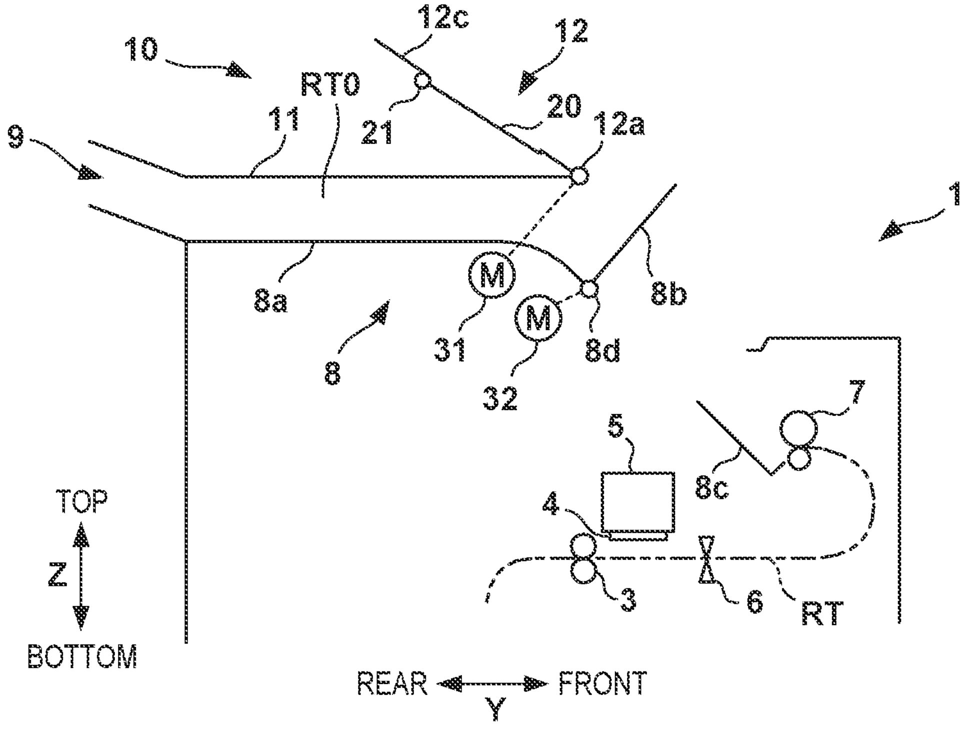
FIG. 10B is a view for explaining the fourth embodiment.

In the first embodiment, the opening/closing portion 12 and the movable portion 8*b* are configured to be manually displaced, but they may be configured to be automatically displaced. FIG. 10B is a schematic view showing an example of this configuration. In the illustrated example, an opening/closing portion 12 is displaced between a closed position and an open position by a driving mechanism (not shown) using a motor 31 as a driving source. For example, if a user instructs, from an operation panel provided in a printing apparatus 1, a displacement to the closed position or the open position, the motor 31 is driven and automatically displaces the opening/closing portion 12.

In the illustrated example, a movable portion 8*b* is also displaced between a closed position and an open position by a driving mechanism (not shown) using a motor 32 as a driving source. For example, if the user instructs, from the operation panel provided in the printing apparatus 1, a displacement to the closed position or the open position, the motor 32 is driven and automatically displaces the movable portion 8*b*.

Alternatively, a structure may be employed in which, without using the driving source such as the motor, an elastic member such as a torsion coil spring is used to bias the opening/closing portion 12 or the movable portion 8*b* only in one displacement direction. For example, a torsion coil spring is provided in a hinge portion 12*a* to constantly bias the opening/closing portion 12 from the closed position to the open position. Further, a lock mechanism is provided which restricts displacement of the opening/closing portion 12 in the closed position. If the user releases the lock by the lock mechanism, the opening/closing portion 12 is automatically displaced to the open position due to the bias of the torsion coil spring. When returning the opening/closing portion 12 to the closed position, the user manually operates the opening/closing portion 12 and locks it by the lock mechanism. The moving portion 8*b* is operated in a similar manner.

Fifth Embodiment

Figure 11A:
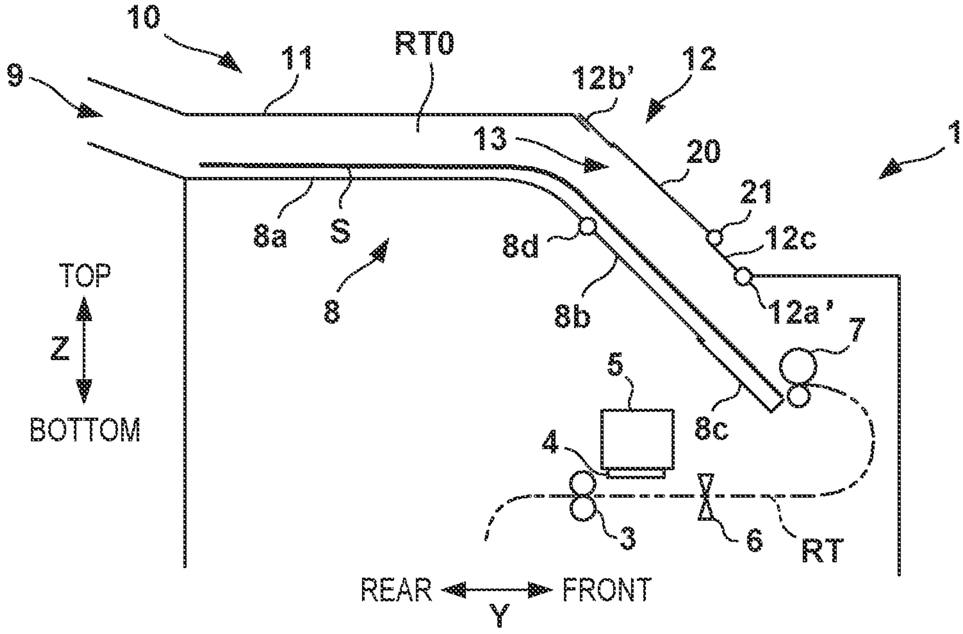
FIG. 11A is a view for explaining an example of the fifth embodiment.
Figure 11B:
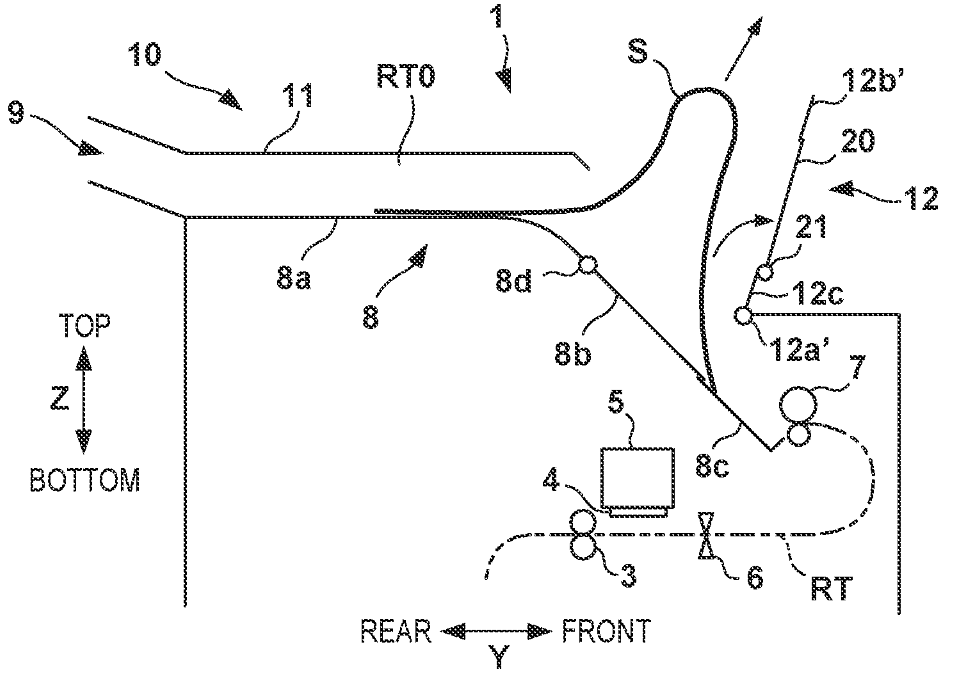
FIG. 11B is a view for explaining an operation according to the example of the fifth embodiment.

In the first embodiment, the structure has been exemplarily shown in which the center of pivot (hinge portion 12*a*) of the opening/closing portion 12 is provided in the downstream end of the opening/closing portion 12, but the position of the center of pivot of the opening/closing portion 12 is not limited to this. FIGS. 11A and 11B show an example of the fifth embodiment. FIG. 11A shows a mode in which an opening/closing portion 12 is in a closed position, and FIG. 11B shows a mode in which the opening/closing portion 12 is in an open position. In the example shown in FIGS. 11A and 11B, a hinge portion 12*a*' in place of the hinge portion 12*a* is arranged in the upstream end of the opening/closing portion 12, and the opening/closing portion 12 is opened/closed with the upstream end as the center of pivot. This structure has an advantage that the user can easily perform an opening/closing operation of the opening/closing portion 12 from the front face side of a printing apparatus 1. A sheet S can be taken out from a stacking portion 8 by pulling out the sheet S upward as in the first embodiment.

Figure 12A:
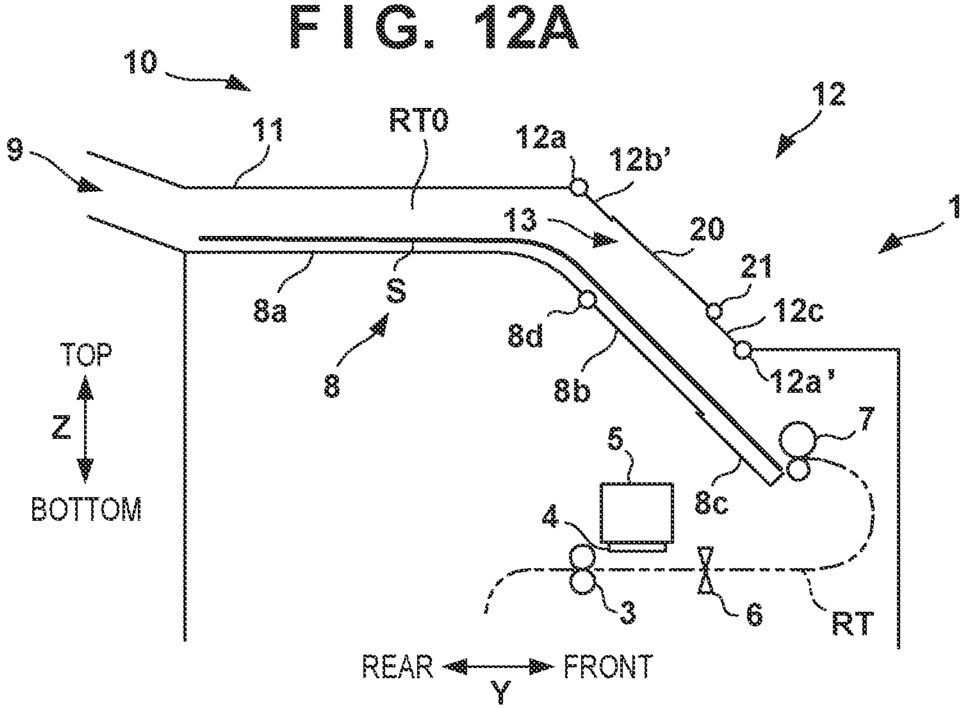
FIG. 12A is a view for explaining another example of the fifth embodiment.
Figure 12B:
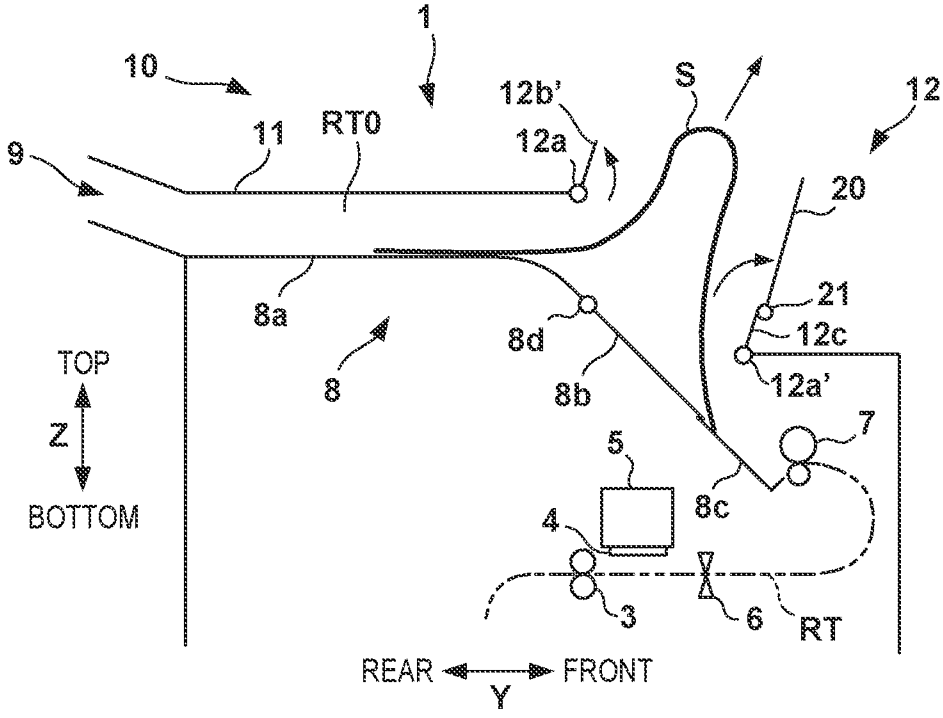
FIG. 12B is a view for explaining an operation according to the other example of the fifth embodiment.

FIGS. 12A and 12B show another example. FIG. 12A shows a mode in which the opening/closing portion 12 is in the closed position, and FIG. 12B shows a mode in which the opening/closing portion 12 is in the open position. In the illustrated example, the opening/closing portion 12 has a two-divided structure formed by an upstream-side portion and a downstream-side portion. A downstream-side portion 12*b*' is pivotable at a hinge portion 12*a*, and an upstream-side correction portion 12*c*, arm portions 12*b* (not shown), and guide members 20 are pivotable at the hinge portion 12*a*'. Since the opening/closing portion 12 has the two-divided structure, it is possible to increase the size of the opening/closing portion 12 while facilitating the opening/closing operation. This leads to easy take-out of the sheet S when the opening/closing portion 12 is open.

Sixth Embodiment

Figure 13A:
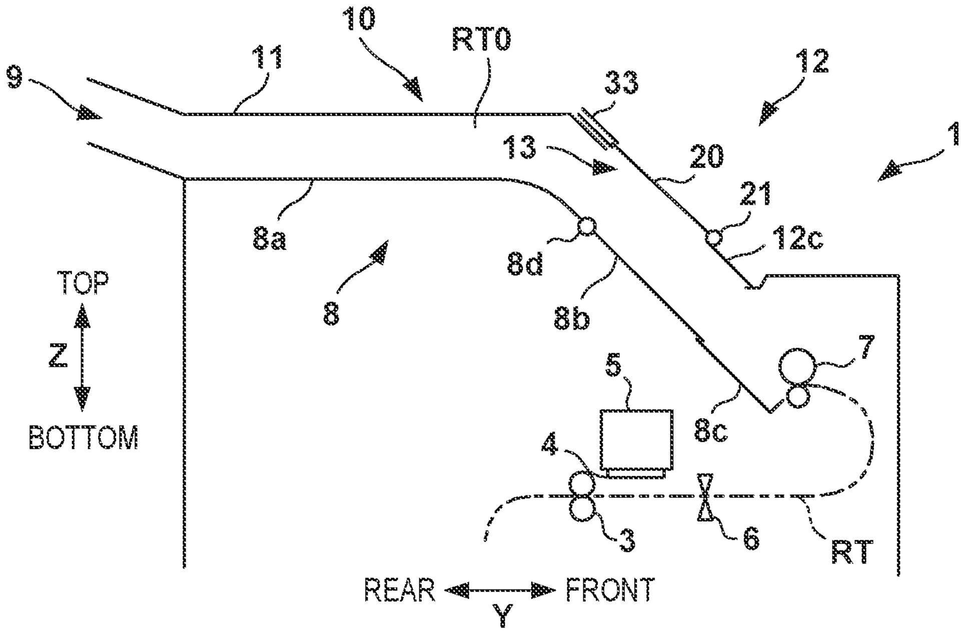
FIG. 13A is a view for explaining the sixth embodiment.
Figure 13B:
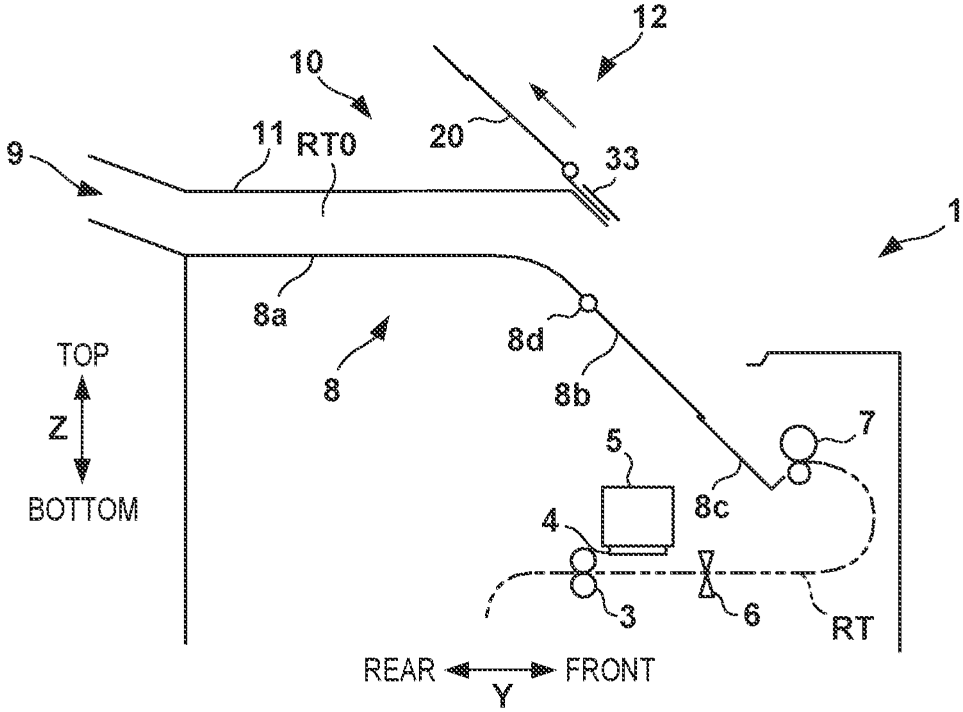
FIG. 13B is a view for explaining an operation according to the sixth embodiment.

In the first embodiment, the structure has been exemplarily shown in which the opening/closing portion 12 is displaced by pivot motion, but a structure may be employed in which the opening/closing portion 12 is displaced by sliding. FIGS. 13A and 13B show an example of this structure. FIG. 13A shows a mode in which an opening/closing portion 12 is in a closed position, and FIG. 13B shows a mode in which the opening/closing portion 12 is in an open position. In the example shown in FIGS. 13A and 13B, a guide portion 33 in place of the hinge portion 12*a* is provided in a fixed portion 11. The opening/closing portion 12 is translated between the open position and the closed position by the guidance of the guide portion 33. The guide portion 33 supports, for example, the left and right end portions of the opening/closing portion 12. In the illustrated example, the translation direction of the opening/closing portion 12 is parallel to a stacking surface 8*e* of a stacking portion 8.

Seventh Embodiment

Figure 14A:
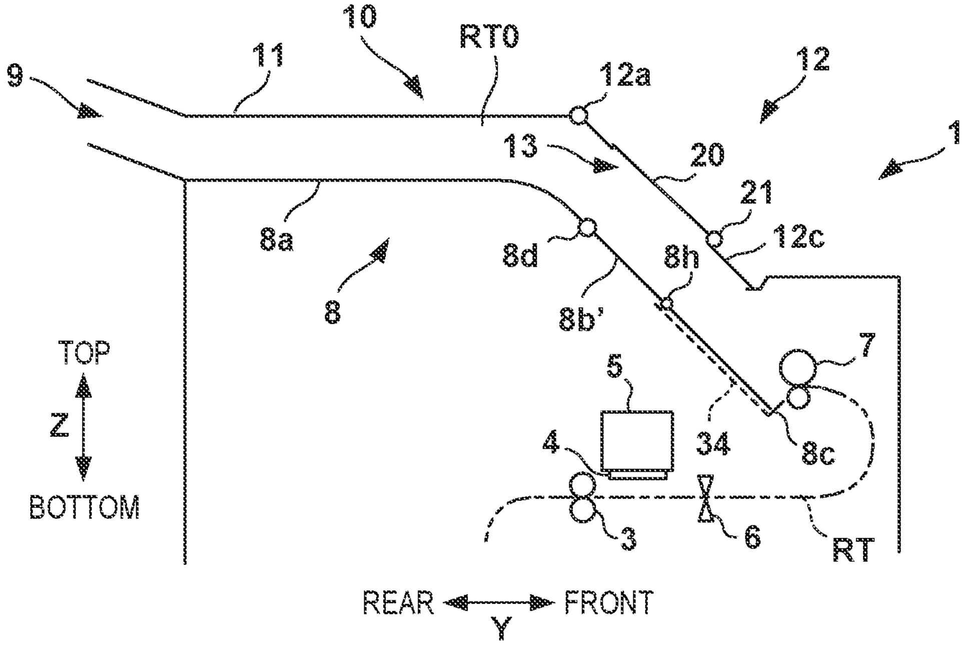
FIGS. 14A and 14B are views for explaining a movable portion according to the seventh embodiment.
Figure 14B:
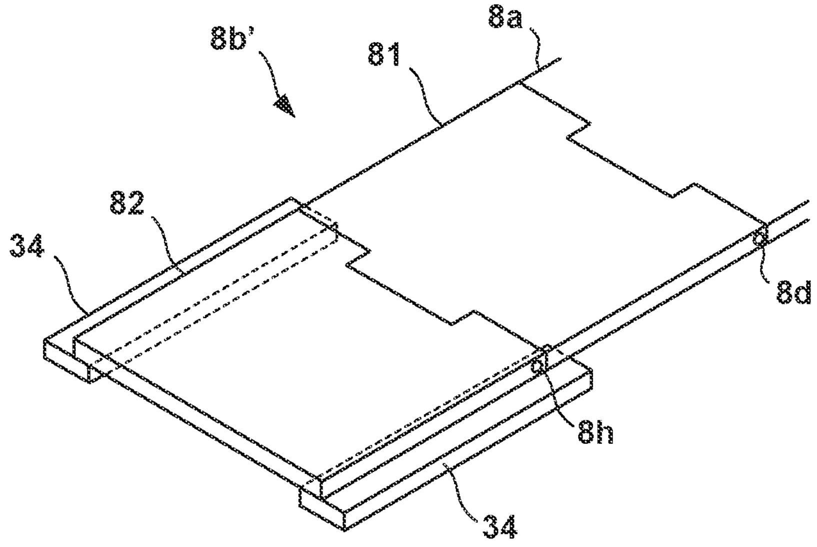
Figure 15A:
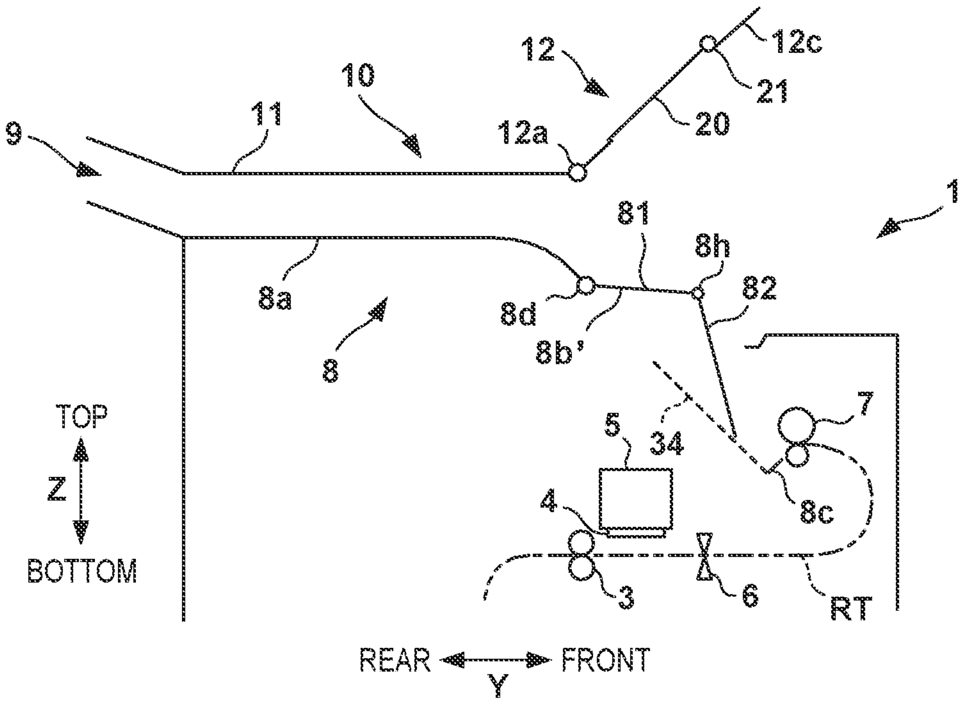
FIGS. 15A and 15B are views for explaining an operation of the movable portion shown in FIGS. 14A and 14B.
Figure 15B:
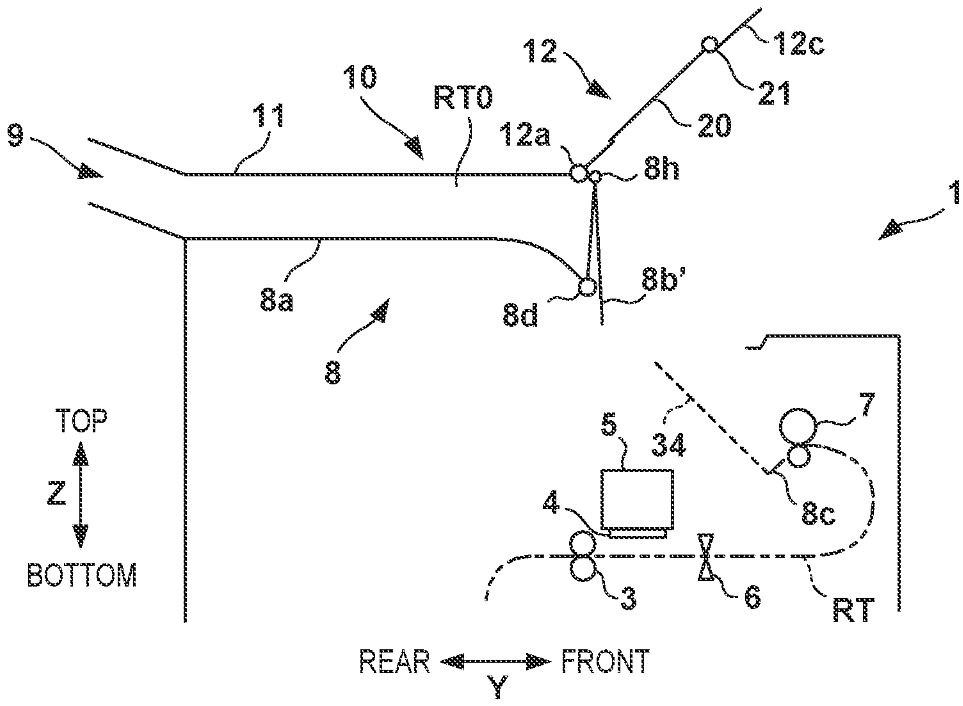

In the first embodiment, it is advantageous for the movable portion 8*b* to have a larger area in the conveying direction of the sheet S such that the inside of the printing apparatus 1 is largely exposed when the movable portion 8*b* is in the open position. However, increasing the size of the movable portion 8*b* may cause an interference between the upstream end thereof and the discharge unit 7 or the like when opening/closing the movable portion 8*b*. Further, if the size of the movable portion 8*b* is increased, the movable portion 8*b* may largely protrude upward from the printing apparatus 1 when it is displaced to the open position. This may cause a constraint on the installation location of the printing apparatus 1. To prevent this, the movable portion 8*b* may be configured to be foldable. FIGS. 14A to 15B show an example of this configuration. FIG. 14A is a schematic view showing the inside of a printing apparatus 1 according to this embodiment, and shows a mode in which a foldable movable portion 8*b*' in place of the movable portion 8*b* is in a closed position. FIG. 14B is a perspective view of the movable portion 8*b*' and support portions 34. FIGS. 15A and 15B are views stepwisely showing a mode of displacing the movable portion 8*b*' from the closed position to an open position.

The movable portion 8*b*' includes an upstream-side portion 81 and a downstream-side portion 82. The portion 81 is pivotably supported, in its downstream end, by a fixed portion 8*a* via a hinge portion 8*d*, and the portion 82 is pivotably supported, in its downstream end, by the upstream end of the portion 81 via a hinge portion 8*h*. The hinge portions 8*d* and 8*h* form pivot axes in the X direction parallel to each other. The portion 81 and the portion 82 can be folded into a mountain shape at the hinge portion 8*h*.

When the movable portion 8*b*' is in the closed position, edge portions thereof are supported by a pair of support portions 34. The pair of support portions 34 are fixed members separated from each other to the left and right, and the left and right side portions of the upstream end of the portion 81 and the left and right side portions of the entire portion 82 are placed on the support portions 34.

When displacing the movable portion 8*b*' from the closed position to the open position, the movable portion 8*b*' is caused to pivot around the hinge portion 8*d* while folding the movable portion 8*b*' as shown in FIG. 15A. At this time, by sliding the upstream end of the portion 82 on the support portions 34, it is possible to cause the movable portion 8*b*' to pivot around the hinge portion 8*d* while folding the movable portion 8*b*' smoothly. Thus, as shown in FIG. 15B, in a state in which the movable portion 8*b*' is displaced to the open position, the movable portion 8*b*' is set in a mode in which it is folded in half with the hinge portion 8*h* as the center line. When displacing the movable portion 8*b*' from the open position to the closed position, the mode reverse to that in the case of displacement from the closed position to the open position is applied.

In this embodiment, the internal structure can be exposed more widely when the movable portion 8*b*' is open while avoiding the movable portion 8*b*' interfering with a discharge unit 7 and the like during opening or closing of the movable portion 8*b*'. This can improve the workability of maintenance work.

Note that the folding structure of the movable portion is not limited to the example shown in FIGS. 14A to 15B. For example, a plurality of the hinge portions 8*h* may be provided to make the movable portion foldable in three or four. The hinge portion 8*h* may be a fragile portion (thin-walled portion or the like) including no rod-like shaft.

Eighth Embodiment

Figure 16A:
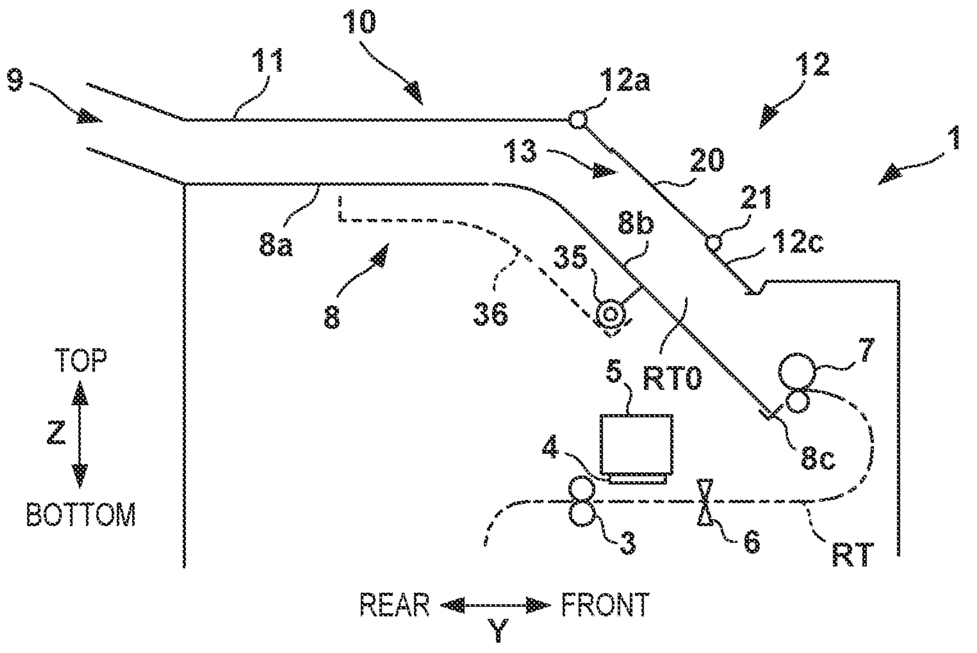
FIG. 16A is a view for explaining a movable portion according to the eighth embodiment.
Figure 16B:
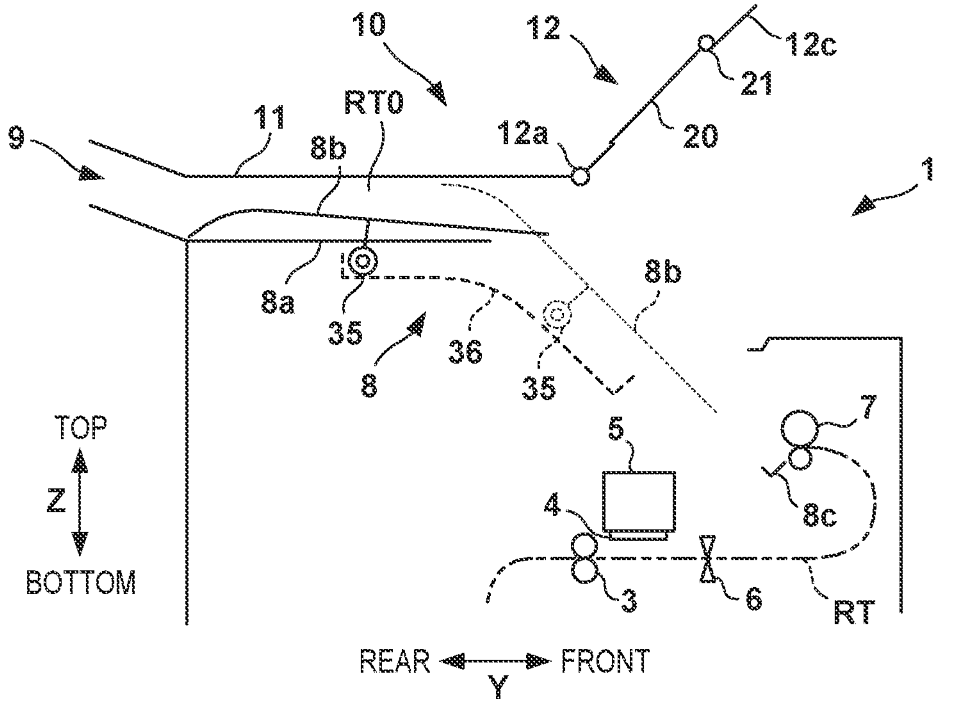
FIG. 16B is a view for explaining an operation of the movable portion according to the eighth embodiment.

In the first embodiment, the structure has been exemplarily shown in which the movable portion 8*b* is displaced by pivot motion, but a structure may be employed in which the movable portion 8*b* is displaced by sliding. FIGS. 16A and 16B shows an example of this structure. FIG. 16A shows a mode in which a movable portion 8*b* is in a closed position, and FIG. 16B shows a mode in which the movable portion 8*b* is in an open position. In the illustrated example, a guide rail 36 which guides displacement of the movable portion 8*b* is provided. The guide rail 36 is arranged on each of both sides of the movable portion 8*b* in the X direction. The movable portion 8*b* is provided with rollers 35 that roll on the guide rails 36.

When displacing the movable portion 8*b* from the closed position to the open position, as shown in FIG. 16B, the movable portion 8*b* is inserted into a gap between a fixed portion 11 and a fixed portion 8*a* along the guide rails 36 while changing the posture around the center of rotation of each of the rollers 35.

Also in this embodiment, the internal structure can be exposed more widely when the movable portion 8*b* is open while avoiding the movable portion 8*b* interfering with a discharge unit 7 and the like during opening or closing of the movable portion 8*b*. This can improve the workability of maintenance work.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{T}$M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-166106, filed Sep. 30, 2020, which is hereby incorporated by reference herein in its entirety.

What is claimed is:

1. A printing apparatus comprising:

a printing unit configured to perform printing on a print medium;

a stacking portion on which the print medium printed by the printing unit is stacked;

a discharge unit configured to discharge the print medium printed by the printing unit to the stacking portion in a conveying direction;

an opening/closing portion configured to displace between a closed position for forming a discharge passage of the printing medium and an open position for opening the stacking portion; and at least one guide member configured to displace between a guide position in which the at least one guide member guides conveyance of the print medium while facing the stacking portion and a take-out position in which the print medium printed by the printing unit is capable of being taken out from the stacking portion, wherein the opening/closing portion forms a portion of the discharge passage on an upstream side with respect to the conveying direction, and a portion of the discharge passage on a downstream side with respect to the conveying direction is formed by a fixed portion which cannot be opened and closed.

2. The apparatus according to claim 1, further comprising:

a storage portion configured to store a roll sheet; and a cutting unit configured to cut a sheet pulled out from the roll sheet, wherein the sheet pulled out from the roll sheet is supplied to the printing unit, and the sheet cut by the cutting unit is stacked as the print medium on the stacking portion.

3. The apparatus according to claim 1, further comprising an outlet port located at a downstream end of the stacking portion with respect to the conveying direction, wherein the outlet port is located in a rear portion of the printing apparatus, and the opening/closing portion is located closer to a front portion side of the printing apparatus than the outlet port.

4. The apparatus according to claim 1, wherein the opening/closing portion is displaced between the closed position and the open position by pivot motion.

5. The apparatus according to claim 4, wherein the at least one guide member is displaced between the guide position and the take-out position by pivot motion.

6. The apparatus according to claim 1, wherein the opening/closing portion is displaced between the closed position and the open position by sliding.

7. The apparatus according to claim 1, wherein the printing unit is configured to discharge ink to the print medium.

8. The apparatus according to claim 1, wherein the at least one guide member is displaced between the guide position and the take-out position by pivot motion.

9. A printing apparatus comprising:

a printing unit configured to perform printing on a print medium;

a stacking portion on which the print medium printed by the printing unit is stacked;

a discharge unit configured to discharge the print medium printed by the printing unit to the stacking portion in a conveying direction;

an opening/closing portion configured to displace between a closed position for forming a discharge passage of the printing medium and an open position for opening the stacking portion; and at least one guide member configured to displace between a guide position in which the at least one guide member guides conveyance of the print medium while facing the stacking portion and a take-out position in which the print medium printed by the printing unit is capable of being taken out from the stacking portion, wherein the stacking portion includes a movable portion at a position facing the opening/closing portion, and the movable portion is displaceable between a closed position for forming a stacking surface for the print medium and an open position for exposing the inside of the printing apparatus covered by the stacking portion.

10. The apparatus according to claim 9, wherein the movable portion is pivotable around a first axis, and foldable around a second axis parallel to the first axis.

11. The apparatus according to claim 10, further comprising a support portion configured to support the movable portion in the closed position, wherein the support portion supports an edge portion of the movable portion.

12. The apparatus according to claim 9, wherein the movable portion is displaced between the closed position and the open position by sliding.

13. The apparatus according to claim 9, wherein the printing unit is configured to discharge ink to the print medium.

14. A printing apparatus comprising:

a printing unit configured to perform printing on a print medium;

a stacking portion on which the print medium printed by the printing unit is stacked;

a discharge unit configured to discharge the print medium printed by the printing unit to the stacking portion in a conveying direction;

an opening/closing portion configured to displace between a closed position for forming a discharge passage of the printing medium and an open position for opening the stacking portion; and at least one guide member configured to displace between a guide position in which the at least one guide member guides conveyance of the print medium while facing the stacking portion and a take-out position in which the print medium printed by the printing unit is capable of being taken out from the stacking portion, wherein the opening/closing portion includes a take-out port through which a user can take out, from the stacking portion, the print medium having undergone printing, the at least one guide member is provided in the opening/closing portion, and the at least one guide member in the guide position overlaps the take-out port.

15. The apparatus according to claim 14, wherein a plurality of guide members, each of which is configured to displace between the guide position and the take-out position, is provided in the opening/closing portion spaced apart from each other in a widthwise direction of the print medium.

16. The apparatus according to claim 15, wherein the plurality of guide members are interlockingly displaced between the guide position and the take-out position.

17. The apparatus according to claim 14, wherein the stacking portion includes, in a part facing the take-out port, a recess portion recessed from a stacking surface for the print medium.

18. The apparatus according to claim 14, wherein the printing unit is configured to discharge ink to the print medium.

* * * * *